United States Patent
Sayers, III et al.

(10) Patent No.: US 9,613,014 B2
(45) Date of Patent: Apr. 4, 2017

(54) SYSTEMS AND METHODS FOR PERSONALIZATION AND ENGAGEMENT BY PASSIVE CONNECTION

(71) Applicants: Foster Joseph Sayers, III, Providence, RI (US); Albert Ho, Boston, MA (US)

(72) Inventors: Foster Joseph Sayers, III, Providence, RI (US); Albert Ho, Boston, MA (US)

(73) Assignee: AgileQR, Inc., Cambridge, MA (US)

( * ) Notice: Subject to any disclaimer, the term of this patent is extended or adjusted under 35 U.S.C. 154(b) by 486 days.

(21) Appl. No.: 13/792,651

(22) Filed: Mar. 11, 2013

(65) Prior Publication Data
US 2013/0238979 A1 Sep. 12, 2013

Related U.S. Application Data

(60) Provisional application No. 61/609,223, filed on Mar. 9, 2012.

(51) Int. Cl.
*G06F 17/00* (2006.01)
*G06F 17/24* (2006.01)
(Continued)

(52) U.S. Cl.
CPC .......... *G06F 17/24* (2013.01); *G06F 17/2235* (2013.01); *G06F 17/2247* (2013.01);
(Continued)

(58) Field of Classification Search
CPC ................ G06F 17/24; G06F 17/2247; G06F 17/30867; G06F 17/30879; G06F 17/2235; G06F 17/30876
(Continued)

(56) References Cited

U.S. PATENT DOCUMENTS

| 8,413,884 B2 * | 4/2013 | Lim ...................... G06Q 30/02 235/375 |
| 8,548,848 B1 * | 10/2013 | Shaw et al. .................. 705/14.1 |

(Continued)

OTHER PUBLICATIONS

Mark Sprague, "QR Codes—Understanding QR Codes", Apr. 2010, Lexington eBusiness Consulting, pp. 23.*
(Continued)

*Primary Examiner* — Chau Nguyen
(74) *Attorney, Agent, or Firm* — American Patent Agency PC; Daniar Hussain; Xiaomeng Shi

(57) ABSTRACT

The present invention is a system and method for personalization and engagement by passive connection. A unique connection, a unique campaigner landing page and a unique constituent landing page are first provisioned in a connections database. Data that is sourced from the campaigner landing page is then associated with the unique connection. The constituent landing page is then personalized in response to a combination of the data just received and the data already collected at that point in the unique connection. Then data that is sourced from the constituent landing page by passive connection is associated with the unique connection. The constituent landing page is then further personalized in response to a combination of the data collected from the campaigner landing page, the data collected from the constituent landing page and the data in the unique connection.

16 Claims, 17 Drawing Sheets

(51) Int. Cl.
*G06F 17/22* (2006.01)
*G06F 17/30* (2006.01)

(52) U.S. Cl.
CPC .. *G06F 17/30867* (2013.01); *G06F 17/30876* (2013.01); *G06F 17/30879* (2013.01)

(58) Field of Classification Search
USPC .......................................................... 715/234
See application file for complete search history.

(56) References Cited

U.S. PATENT DOCUMENTS

| | | | |
|---|---|---|---|
| 8,756,280 B1* | 6/2014 | Jordan et al. | 709/204 |
| 9,220,985 B1* | 12/2015 | Auterio | A63F 13/00 |
| 2004/0044566 A1* | 3/2004 | Bostelmann et al. | 705/14 |
| 2005/0076014 A1* | 4/2005 | Agarwal et al. | 707/3 |
| 2006/0212790 A1* | 9/2006 | Perantatos et al. | 715/501.1 |
| 2007/0136255 A1* | 6/2007 | Rizzo et al. | 707/3 |
| 2007/0215685 A1 | 9/2007 | Self et al. | |
| 2008/0281706 A1* | 11/2008 | Sullivan | 705/14 |
| 2009/0138439 A1* | 5/2009 | Yeung | G06F 17/3087 |
| 2009/0292584 A1* | 11/2009 | Dalal et al. | 705/10 |
| 2010/0042635 A1* | 2/2010 | Venkataramanujam | 707/100 |
| 2010/0057586 A1* | 3/2010 | Chow | G01S 19/14 705/26.1 |
| 2010/0059264 A1* | 3/2010 | Hasegawa | H05K 1/0215 174/262 |
| 2010/0140343 A1* | 6/2010 | Nakamura | G06Q 10/00 235/375 |
| 2010/0198678 A1* | 8/2010 | Burst et al. | 705/14.39 |
| 2011/0040681 A1* | 2/2011 | Ahroon | G06Q 20/10 705/39 |
| 2011/0047213 A1* | 2/2011 | Manuel | 709/204 |
| 2011/0060717 A1* | 3/2011 | Forman et al. | 706/54 |
| 2011/0153422 A1* | 6/2011 | Cousins | 705/14.53 |
| 2011/0196821 A1* | 8/2011 | Hellerman et al. | 707/600 |
| 2012/0036182 A1* | 2/2012 | Stolorz et al. | 709/203 |
| 2012/0078782 A1* | 3/2012 | Schoenberg | G06Q 20/102 705/40 |
| 2012/0223131 A1 | 9/2012 | Lim et al. | |

OTHER PUBLICATIONS

"How-To: Change The URL That Your QR Code Points To", Nov. 28, 2011, QReate & Track, http://createandtrack.com, pp. 4.*

* cited by examiner

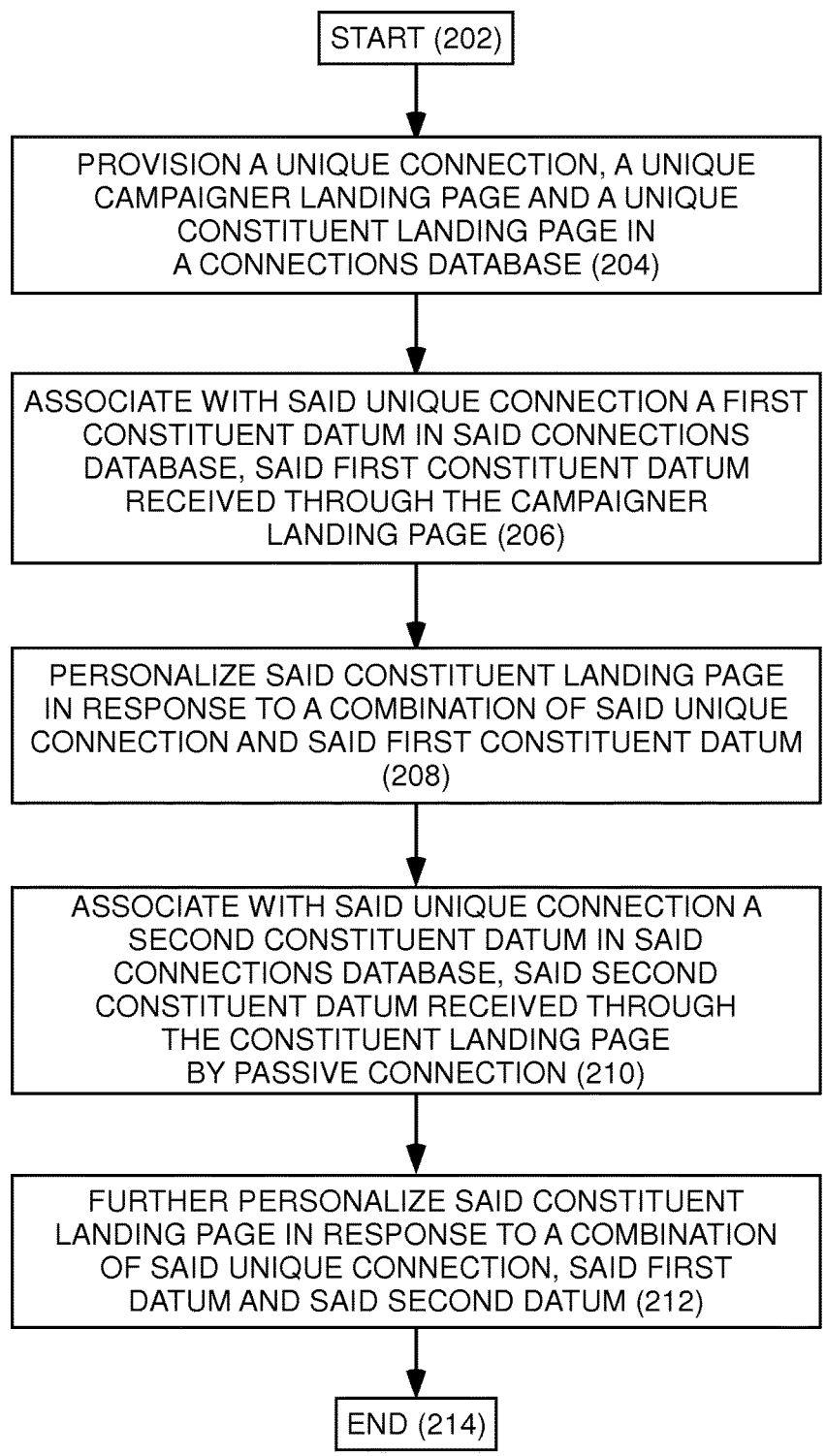

You are managing 61 Voters. To manage additional Voters, order more connection cards ☐ John Wayne
Clicks: 9
Messages: 0
[Manage] [View]

☐ Jane Eyre
Clicks: 3
Messages: 0
[Manage] [View]

☐ Jocelyn Wright
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

☐ —
Clicks: 0
Messages: 0
[Manage] [View]

| | Manage ID:<br>211c1a0b83b9c89fa9c4bdede203c1e3<br><<Go Back to Manage Voters |

| Profile | Canvass | Interactions |

Basic Information

| First Name: | John |
| Last Name: | Wayne |
| Email Address: | john@wayne.com |
| Phone Number: | |
| Sex: | Male |
| Date of Birth: | 1992-05-19 |

Political Information

| Party Affiliation: | Democrat |
| Decided: | Walter Plant |

Manage ID:
211c1a0b83b9c89fa9c4bdede203c1e3
<<Go Back to Manage Voters

Profile | Canvass | Interactions

Canvassing

Opening Script: [READ] *Hi my name is [your name] and I'm campaigning for Albert Ho for Mayor of Boston, 2013, I'd like to talk with you about the campaign...*

Support: ☐ Donor
☐ Signage

How Likely To Vote: [LOW] ○1 ○2 ○3 ○4 ●5 [HIGH]

Issues: Agrees with position on Renewable energy:
○Yes ○No ○Not Sure

Agrees with position on Abortion:
○Yes ○No ○Not Sure

Agrees with position on Entrepreneurship:
○Yes ○No ○Not Sure

Agrees with position on Immigration:
○Yes ○No ○Not Sure

Fig. 6
600

Manage ID:
211c1a0b83b9c89fa9c4bdede203c1e3
<<Go Back to Manage Voters

Profile   Canvass | Interactions

Personalized Message

Warning! Content below gets shown to your Voter on the landing page

Personal Message:   Hi Foster

Thanks for your support! I'll clean this city up good!

I promise to accomplish the following:

Save Changes

700

About This Connection

When:

Where:

Short URL:   http:/bit.ly/rPBzR1

Code:

800

900

1000

1100

1200

1300

Your Personal Link to the Campaign
http://bit.ly/ys09Pr

1600

SYSTEMS AND METHODS FOR PERSONALIZATION AND ENGAGEMENT BY PASSIVE CONNECTION

REFERENCE TO RELATED APPLICATIONS

The present application claims priority from provisional application U.S. Ser. No. 61/609,223, entitled "Systems and methods for personalization and engagement by passive connection," filed on Mar. 9, 2012, the entirety of which is hereby incorporated by reference herein.

FIELD OF THE INVENTION

The present invention is generally related to Internet web software, mobile device software, and media distribution. More specifically, this invention relates to a system and method for personalization and engagement by passive connection using uniquely generated hyperlinks that serve personalized media through a backend computer-implemented process. The hyperlinks can be represented as an URL, QR code, or other such representation. The present invention may be used to serve personally relevant media to constituents for the purposes of engaging with the disseminating party, product sales, maintaining relationships, provision of services, data collection, data distribution, etc.

BACKGROUND OF THE INVENTION

The statements in this section constitute background to understanding the invention, and may not constitute prior art.

The historical progression of Internet technology has shown an upward trend in the personalization of web content. The first generation of mainstream Internet, commonly referred to in the industry as "Web 1.0," was a static Internet mainly dominated with static web documents that presented static content, linked together via hyperlinks and indexed into simple web directories (such as Yahoo!) that also offered web search as a by-product feature. Web 1.0 essentially was an electronically and remotely accessible library that mirrored a traditional library such as the Boston Public Library or the Library of Congress, except that it did not close at night or on weekends. Content on the Internet was created by webmasters; the same webmasters that created the group of hyperlinked static web pages that constituted their domain on the Internet. At this point, any visitors to a web document could reasonably expect that document to carry the same content within hours, days, or even months of first consuming it, with the same content served to all visiting parties. Since only one party traditionally had the privilege to publish content within a given domain, the Web 1.0 could be described as an index of centrally-generated content. Additionally, there was very little interaction, if any, between a webmaster and a visitor to his site. What little interaction there was consisted mainly of signing "guestbooks" and if the webmaster posted his e-mail address, perhaps a few e-mails from interested visitors. There was also very little interaction between visitors. Visitors seldom knew who else was visiting the same website; they knew little of others who were likely to share similar interests by virtue of having stumbled on the same site. The best a visitor could do to interact with other visitors was perhaps to cross-reference the site's "guestbook" and start an e-mail conversation with another self-identified visitor. Some early Web 1.0 sites may also have managed "forums" for visitor-to-visitor interaction, or perhaps even webmaster-to-visitor interaction, with the goal of curating a community around common interests. For the most part though, the Web 1.0 Internet was largely composed of these limited forms of interparty communication and at the same time was growing in such a way as to a mass a great corpus of static web documents serving static centrally-generated content. Compared with the modern day Internet, this early Internet was static and impersonal to a user, where information flowed in mainly one direction.

As the Internet rapidly grew, the task of managing large bodies of static web pages quickly became an intractable problem for many webmasters. Content demand outgrew content supply through Web 1.0 methods of static publication that the industry largely shifted to what would become known as Web 2.0. The evolution came about as it became standard practice for websites to serve dynamic web pages powered by a web application and in many cases with its content data organized and indexed by a database engine. This dynamic web page generation paradigm made the problem of managing large bodies of web pages a tractable problem, since the management of a single script could account for what used to be hundreds, thousands or even millions of individual web pages. The technology for serving dynamic web pages already existed at this point—it was merely the widespread adoption and standardization of such practice that made this a significant evolution of the Internet. The dynamic generation of web content was the first step toward web personalization whereby different content could be served to different people based on preferences they indicated. To preserve these user preferences over multiple web page requests within a domain, practices emerged and standards were adopted once again—practices such as the usage of browser cookies, usage of web sessions and ultimately, user registration for login credentials for the privilege of personalized interaction with a web site. Not much new technology was utilized in this shift, but as explained before, it was the widespread adoption and standardization of these practices that distinguished this new era of web usage.

All these changes just described brought about the most important paradigm shift that is attributed to Web 2.0: decentralization of website content. This can also be described as an era of user-generated content (UGC) whereby content is openly sourced from the users of a website rather than exclusively published by the owner of the website. Since a user could now personalize his interaction with a website through a web login, he could in effect control his own small corpus of content within that website, in accordance with that website's terms. The ability to control the privacy of his information, access to his content and presentation of his content empowered the user and gave him more avenues for self-expression, as he came to entrust the maintenance of his content to websites which in return delivered on the promise of ease of content publication and distribution. At the same time, the websites themselves benefited from the increased traffic from an explosion in the supply of content, most of which was generated by its users.

The next paradigm shift as a result of the wide adoption of UGC practice in Web 2.0 was social networking. As UGC websites became an avenue for self-expression and content distribution, communities formed around this user-generated content to consume it. Whether it was a community of friends, followers, business associates, lovers, etc., websites emerged to help users build their own little communities around the content they created. For example, Facebook helps users build a community of their own friends around their content (profile, photos, life timeline, status updates), Twitter builds a community of followers around a user's brief in-the-moment thoughts, and foursquare builds a community of follows around broadcasts of a user's current locale. Other social networking websites build communities around other types of content.

At the time of this writing, the Internet is believed to be in the final stages and maturation of Web 2.0 paradigms, and it is widely debated what major shift will be attributed the identification of Web 3.0. Throughout this brief discussion of the evolution of the Internet, one might wonder how and why this pattern of events came to be. The explanation is perhaps just as elusive as the explanation for analogue patterns of events such as the history of the world, the movement of stock prices, or the events of someone's life. As such, there often emerge multiple and sometimes conflicting theories that retrofit past events in an attempt to explain the past and predict the future. Some are derived from the viewpoint of economics (incentives, supply/demand), others from psychology, yet others from physics, yet others from religion, and the list goes on. For this reason, we do not attempt to form a theory of explanation, but instead look at the whole picture to identify a sustainable trending theme that reveals the underlying problem being solved via the evolution of the Internet.

Based on the evolution of the Internet, one candidate for a sustainable trending theme of the Internet is the ease of information access. If analyzed from this angle, one could easily explain the advent of Web 1.0 static web pages as a mere reflection of the information made accessible to the public through traditional libraries, bookstores and newspaper stands. Instead of doing research quietly at the university library during library hours, a student could do research at home with an Internet connection, with loud music playing in the background, at any time of day or night. Ease of information access is a plausible theme, however, it ceases to become a trending theme at the outset of Web 2.0 shifts. While information was made more accessible and readily available by advances in Web 1.0 adoption, it was not made even more accessible and available with the advances of Web 2.0. In fact, one could even argue that information was effectively made less available especially in conjunction with the Web 2.0 paradigm of requiring user registration and login credentials before accessing content.

Taking another angle on information access, another candidate for a sustainable trending theme of the Internet would be an increase in the supply of information. Unlike the ease of information access, this theme appears to trend across the Web 1.0 and Web 2.0 shifts. In fact, with the advent of the user-generated content paradigm of Web 2.0, there has even been an exponential explosion in the supply of information on the Internet as all Internet users were invited to contribute content on a wide scale. However, this trending theme of increase in the supply of information on the Internet is not a practically sustainable theme by itself. Even though the technical challenges of scaling web storage and concurrent access to this ever-growing corpus of information are being solved adequately, the fact still remains that the growth in supply of Internet content has far outpaced the combined Internet users' ability to consume it, let alone make sense of it. This is even true within internal data stores at major corporations and especially true among consumers of various services on the Internet. Therefore, the massive growth of content supply on the Internet is not an especially insightful theme to isolate because it does not exhibit qualities of a solution to an underlying problem that is constantly being evolved by Internet pioneers. It is essentially creating its own problem.

If neither easing access to information or supplying more information are sustainable trending themes that reveal a series of solutions to a problem that Web 1.0 and Web 2.0 were successively trying to solve for mankind, then what if we modified the general assumption that Internet users seek information into making a more specific assumption that Internet users seek information that is relevant to them? In this case, we find that all evolutions in Web 1.0 and Web 2.0 fit into the sustainable trending theme of web personalization. In fact, many argue that the incoming Web 3.0 shift will be a widespread adoption of web personalization and consequently personalization technologies. Web personalization is the general solution to the problem of increasing the relevance of content consumed by Internet users. Taken from the beginning, the emergence of Web 1.0 static web pages by itself was a step toward personalizing how people interact with information. Before Web 1.0 Internet, one had to make a trip to the local library to seek and consume information, which meant following the library's rules on being quiet and not chewing gum, going to the library during regular library hours only, registering for library membership in order to lease information (i.e. library card to borrow books), and being subjected to the library's politically-driven limits on content type and supply (purchase decisions for books and other media are often subject to approval by town or university boards and conform to policies such as no-pornography). The static web pages of Web 1.0 liberated people from the library's institutional limitations to getting a personalized experience in interacting with information. Through the Internet of Web 1.0, Internet users could now consume information at three in the morning or on Sundays, could blast loud music while consuming information, and could even access pornography whenever and however that user wanted. In effect, Web 1.0 static web pages represented the first successful step toward personalization of the way people seek and consume information.

Next was the shift from a large corpus of static web documents to dynamically-generated web documents. This was an important next step in personalization because the widespread ability to program a single server-side script to produce different web documents based on user actions or other conditions (such as time or location) was necessary to personalize a website to a user's preferences. These server-side scripts were utilized in the static corpus of Web 1.0 documents to enable very basic interactions, such as filling out simple forms. Over time, however, these scripts became much more sophisticated and web applications began to emerge, which enriched the selection of possible user actions to more than just filling out forms. The major shift from Web 1.0 to Web 2.0 can be identified in this gradual change. On a wide scale, users could and were encouraged to interact with websites in ways that were more personalized than ever before. The relationship between user and website achieved a level of personalization where information was exchanged in both directions, rather than just one, which made web interaction more meaningful and personal. Users created content and stored it on the website, while the website served the user other content that was relevant based on information gathered about the user. To enhance the personalization of the user's experience, websites gathered personal information such as e-mail address, phone number, name, gender, location and domain-specific preferences. This personal data was protected and made accessible, editable, updatable and controllable to the user through the institution of user login authentication, which required registration with the website.

The next wave of advancement in web personalization was in the emergence of social networks. Social networks created different ways in which a user could maintain a community of other users to consume the content he creates or join other communities that consume content others create. The community would itself be a group that was relevant to the user in some way—they could be friends, fans, business associates, lovers, or perhaps others who simply shared similar interests. In other words, social networks increased the personalization of a user's experience of consuming content on the web. In a social network, one's consumption of web content achieved a degree of relevance never before achieved.

Web personalization can be identified as the sustainable trending theme driving the evolution of the Internet from Web 1.0 to Web 2.0 paradigms because it represents a general solution to the problem of relevance in the process of interacting with information. It is the only theme whose agenda has been significantly advanced by each successive paradigm shift in the history of the Internet.

In view of the above, and in response to the shift associated with the transition from Web 2.0 to Web 3.0, the inventors have developed the systems and methods described in this patent application. It is against this background that the various embodiments of the present invention were developed.

BRIEF SUMMARY OF THE INVENTION

The present invention is a system and a method for personalization and engagement by passive connection. One embodiment of the present invention is a method for serving personalized content to and engaging a constituent. This method involves the steps of provisioning a unique connection, a unique campaigner landing page and a unique constituent landing page in a connections database, then associating with said unique connection a first constituent datum in said connections database, said first constituent datum received through the campaigner landing page, then personalizing said constituent landing page in response to a combination of said unique connection and said first constituent datum, then associating with said unique connection a second constituent datum in said connections database, said second constituent datum received through the constituent landing page by passive connection, and then further personalizing said constituent landing page in response to a combination of said unique connection, said first datum and said second datum.

Another embodiment of the present invention is the method described above, further comprising the step of generating a unique code that represents said unique connection, which when followed, serves said unique constituent landing page.

Another embodiment of the present invention is the method described above, further comprising the step of printing said unique code on a print media.

Another embodiment of the present invention is the method described above, wherein passive connection is an omission of a login session.

Another embodiment of the present invention is the method described above, further comprising the step of redirecting a request for said constituent landing page to a separate web document.

Another embodiment of the present invention is the method described above, wherein personalizing said constituent landing page comprises serving content on said constituent landing page in a personalized order in response to said combination of said unique connection and said first constituent datum; and wherein further personalizing said constituent landing page comprises serving content on said constituent landing page in a further personalized order in response to said combination of said unique connection, said first datum and said second datum.

Another embodiment of the present invention is the method described above, further comprising the step of reordering content on said constituent landing page into a personalized order.

Another embodiment of the present invention is the method described above, wherein said first constituent datum is a datum selected from the group consisting of a digital media content, a date/time stamp and geo-location coordinates.

Another embodiment of the present invention is the method described above, wherein said second constituent datum is a datum selected from the group consisting of a digital media content, a date/time stamp and geo-location coordinates.

Another embodiment of the present invention is the method described above, further comprising the step of determining a constituent engagement level in response to said combination of said unique connection, said first datum and said second datum.

The present invention also includes a related system for serving personalized content to and engaging a constituent. The system comprises one or more memories for storing program code, one or more communication links to a database one or more processors, operatively connected to the one or more memories, for executing the stored program code. When the stored program code is executed, the system performs a process comprising the steps of provisioning a unique connection, a unique campaigner landing page and a unique constituent landing page in a connections database, then associating with said unique connection a first constituent datum in said connections database, said first constituent datum received through the campaigner landing page, then personalizing said constituent landing page in response to a combination of said unique connection and said first constituent datum, then associating with said unique connection a second constituent datum in said connections database, said second constituent datum received through the constituent landing page by passive connection, and then further personalizing said constituent landing page in response to a combination of said unique connection, said first datum and said second datum.

Another embodiment of the present invention is the system described above, wherein the stored program code when executed further causes the system to perform the step of generating a unique code that represents said unique connection, which when followed, serves said unique constituent landing page.

Another embodiment of the present invention is the system described above, wherein the stored program code when executed further causes the system to perform the step of printing said unique code on a print media.

Another embodiment of the present invention is the system described above, wherein passive connection is an omission of a login session.

Another embodiment of the present invention is the system described above, wherein the stored program code when executed further causes the system to perform the step of: redirecting a request for said constituent landing page to a separate web document.

Another embodiment of the present invention is the system described above, wherein personalizing said constituent landing page comprises serving content on said constituent landing page in a personalized order in response to said combination of said unique connection and said first constituent datum; and wherein further personalizing said constituent landing page comprises serving content on said constituent landing page in a further personalized order in response to said combination of said unique connection, said first datum and said second datum.

Another embodiment of the present invention is the system described above, wherein the stored program code when executed further causes the system to perform the step of reordering content on said constituent landing page into a personalized order.

Another embodiment of the present invention is the system described above, wherein said first constituent datum is a datum selected from the group consisting of a digital media content, a date/time stamp and geo-location coordinates.

Another embodiment of the present invention is the system described above, wherein said second constituent datum is a datum selected from the group consisting of a digital media content, a date/time stamp and geo-location coordinates.

Another embodiment of the present invention is the system described above, wherein the stored program code when executed further causes the system to perform the step of determining a constituent engagement level in response to said combination of said unique connection, said first datum and said second datum.

One embodiment of the present invention is a method for serving personalized content to and engaging a constituent. This method involves the steps of displaying a unique constituent landing page to at least one constituent, said constituent landing page personalized for said constituent and said constituent led to said constituent landing page using a leave-behind; processing a constituent action taken by said constituent on said constituent landing page by passive connection; and recommending at least one campaigner action for further personalizing said constituent landing page in response to said constituent action.

Another embodiment of the present invention is the method described above, further comprising the step of displaying a unique campaigner landing page to at least one campaigner in response to an action taken by said campaigner on said constituent landing page.

Another embodiment of the present invention is the method described above, further comprising the step of processing an editing action taken by said campaigner on said campaigner landing page that further personalizes said constituent landing page.

BRIEF DESCRIPTION OF THE DRAWINGS

The invention will be understood by the following detailed description in conjunction with the accompanying drawings, wherein like reference numerals designate like structural elements, and in which:

FIG. 2 shows a flowchart of a method for serving personalized content to and engaging a constituent, in accordance with another embodiment of the present invention.

FIG. 3 illustrates a sample of a user interface for managing a plurality of constituent connections, in accordance with yet another embodiment of the present invention.

FIG. 4 illustrates a sample of a user interface for filling in points of identity of a constituent as that information reveals itself, in accordance with one embodiment of the present invention.

FIG. 5 illustrates a sample of a user interface for mobile canvassing on a voter constituency, in accordance with one embodiment of the present invention.

FIG. 6 illustrates a sample of a user interface for personalizing the landing page for a constituent, in accordance with one embodiment of the present invention.

DETAILED DESCRIPTION OF THE INVENTION

Personalization and Engagement by Passive Connection

Figure 1:
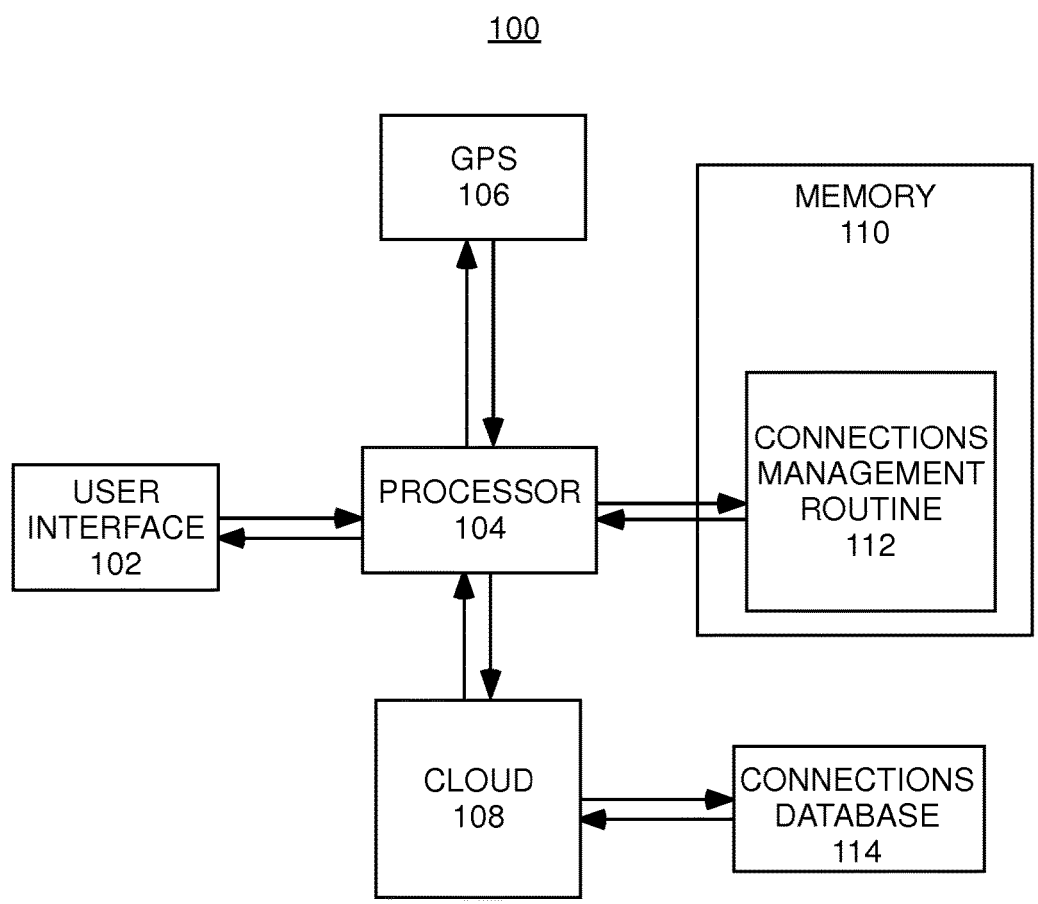
FIG. 1 shows a block diagram of a system for serving personalized content to and engaging a constituent, in accordance with one embodiment of the present invention.

Accordingly, the disclosed invention generally pertains to systems and methods for personalization and engagement by passive connection. Passive connection refers to the quality of omitting a registration requirement in the process of consuming personalized content. It also refers to the quality of accessing personalized information without a registration requirement, such as but not limited to the omission of a login requirement. Registration involves the process of setting up an identity with the subject of registration, which may comprise the step of providing a username and password, which may further comprise the step of providing personally identifiable information, and which may further comprise the step of providing other private information. Such configuration of personalized information would normally require an "account" on the system since that is the traditional method for web systems to organize that collection of personal information, preferences and other data related to an individual user. The goal of passive connection is to provide the same level of personalization while eliminating the registration, login, account creation and account management requirements that typically accompany such personalization. In this invention, various methods may be carried out and various systems may be used to the effect of achieving passive connection personalization. Such a system and its associated methods can generally be best embodied in and executed on a network-enabled computer system. Furthermore, the network-enabled computer system is best implemented as a mobile wireless network-enabled computer system.

The passive connection technique makes use of unique links generated on a backend computer system. Unique links are distinct references to an Internet resource, which are commonly called uniform resource locators (URL's). Unique links can be represented in many different forms but the most typical form is a character string that follows some translatable pattern (most commonly "scheme://domain:port/path?query_string#fragment_id"). Unique links could also be represented as two-dimensional image such as a quick response code (QR code). Any other form of representing a reference to an Internet resource is contemplated under the definition of a unique link. Unique links can also be represented in shortened form using various URL-shortening techniques. For example, one URL-shortening technique is to apply a hashing function to a long URL to generate a six-character hashing result string. The resultant string then forms a new URL in conjunction with a shortened domain whose function is to maintain a database of long URL's and their shortened forms and perform forwarding operations in response to web server requests.

One aspect of the invention relates to the process of generating unique links. Various methods can be used to generate unique links. For example, within the example domain "doma.in" a unique link may look like "doma.in/j30gje" and another may look like "doma.in/h5j29e." The subdomain segment of an URL may also be used, such as "398tj2.domain.com" or "hg84h4.domain.com." In the example case of "doma.in/j30gje", the last six characters represent the distinguishably unique segment of the unique link. One example way to generate these characters is to implement a random generator of 6-character alphanumeric strings. Another way to generate these characters is to build a hash function that takes as input some content related to the destination of the URL and maps it to the space of 6-character alphanumeric strings. For example, one could apply a hashing function to the title of the destination web page to generate a unique link. Another possible way to generate unique links is to use a simple alphanumeric system and provision the URL extensions in alphanumeric order. One example of this is a pure sequential numeric generator that outputs "000", "001", "002", "003", "004", . . . , "999" in succession. Another example of this is a sequential alphabetic generator that outputs "aaa", "aab", "aac", "aad", . . . , "zzz" in succession. Yet another example of this is a sequential alphanumeric generator that outputs "aaa000", "aaa001", . . . , "zzz999" in succession. Yet another example of this may also employ the use of a hierarchy of base folders, such as "john/aaa001", "john/aaa002", . . . , "peter/zzz999" in succession. One of skill in the art will recognize that these methods can be modified or combined to produce other valid schemes for unique URL generation within a domain.

Depending on the technique used, there may be variations in the number of possible unique links that can be generated, variations in the quality of the unique links generated, or variations in the number of collisions of unique links generated. If a larger space of possible unique links is desired, the limitation of 6 characters can be lifted to allow any variable number of characters. For example, if instead an implementation of 32 alphanumeric characters is used instead of 6 alphanumeric characters, the space of possible unique links would grow from $62^6$ (56 billion permutations) to $62^{32}$ ($2.27 \times 10^{57}$ permutations). The quality of unique links generated can be determined based on factors that affect the use case. For example, if the use case is such that unique links are being generated for people to recall from memory, the quality of the unique links generated would positively trend with its simplicity. In that particular case, a randomly-generated 6-character alphanumeric string would be considered a low-quality unique link, whereby a sequentially-generated 3-character alphanumeric string ("000", "001", . . . , "ZZZ") would be considered a high-quality unique link. Invariably, a technique that is engineered to generate high quality unique links may also be more limiting in the space of possible unique links. As applied to the last example, for the 3-character alphanumeric string technique (a high-quality technique for the use case of memory recall) the space of possible unique links is $62^3$ (only 238,328 permutations), whereby for the 6-character alphanumeric string technique (a low-quality technique for the given use case) the space of possible unique links is $62^6$ (56 billion permutations). Finally, it is noted that another variable in generating unique links is the collision probability. This variable is especially relevant in certain use cases in which generating unique links must be fast and frequent. As in any application of hashing functions, one of the most important qualities of a hashing function is the minimization of its collision frequency. In the examples previously cited, the sequentially-generated 3-character alphanumeric string method's collision frequency is 0 because by virtue of being sequentially generated, the generator will simply increment the most recently generated string by one and guarantee no collision. If using a hashing function on some destination content, the collision frequency will simply approach the collision frequency of the hashing function itself. If using a random 6-character alphanumeric generator, for example, collision frequency would approach $1/62^6$.

Computing devices include iPhone, Android, Blackberry, a digital camera like the Sony Cybershot, Panasonic Lumix, Nikon Coolpix, Casio Exilim, Canon Powershot, a mobile tablet like the iPad, a mobile industrial device like the Motorola MC75 or Psion Teklogix, or any personal computer. One of skill in the art will recognize that there are many other possible devices, all of which fall within the scope of this invention. The computing device is most effective if it is able to electromagnetically communicate with other devices. Means to communicate electromagnetically with other devices may include wired communication, such as sending electromagnetic signals through Ethernet wire, coaxial cable wire, fiber optic wire, copper wire, platinum wires, and the like; wireless communication, such as sending radio signals, visible light, laser, gamma rays, x-rays, microwaves, ultraviolet waves, and the like. The communication may follow one or more protocols of communication, protocols that include but are not limited to TCP/IP, UDP, ICMP, IMAP, SMTP, FTP, HTTP, or HTTPS. Being "network-enabled" typically means being able to communicate with one or more other devices that are able to interpret the communication protocols that the digital media capture device use. The computing device is also most effective if it is able to communicate with one or more databases. A database could be contained within the computing device itself as a component, or it could be a remote database that the computing device communicates with using any of the electromagnetic communications means described above. A database, for the purposes of understanding this invention, should be able to persist data representing connections and its meta data. It may use conventional database engines to handle and query the persisted data, such as by using MySQL, POSTGRES, Sybase, Sqlite, Oracle or other such database engines.

One aspect of the invention relates to a system for managing the destinations of unique connections. A connection is a data structure that manages at least one landing page and directs or routes visitors to one or more landing pages. The connection may direct a constituent to a landing page set up by a user of the system to serve relevant content to that constituent. Landing pages may be "owned" by the connection in a one-to-one relationship, or a connection could own more than one landing page in a one-to-many relationship. Any given landing page could also be shared between multiple connections in a many-to-many relationship. Each connection may be configurable through a computer-implemented interface. The purpose of the connection may, for example, be for the system's user to remind himself about an interaction he made in person with a constituent. The reminder can be captured by a text note, a date/time stamp, a geo-location, a combination of these or other such content that is used to capture the circumstances of a meeting like that.

One aspect of the invention relates to setting up a default landing page for a connection. The connection can direct a visitor to the default landing page as its primary function. This can be accomplished by storing in a database the location of a default landing page that is owned and editable by the user of the system who also owns the connection. The default landing page can, for example, allow the owning user to post information about himself that is typically posted to a social networking website. It could also contain links to web documents hosted at other social networking sites as well, giving the landing page an social networking aggregation role and serving as a directory of the owning user's web presence.

One aspect of the invention relates to re-configuring connections to direct a visiting constituent to content located elsewhere. The content can be stored at and retrieved from another location on the Internet, or stored and retrieved locally on the computing device on which the system resides. The re-configuration of connections to point a visitor elsewhere can be achieved through a connection management interface whereby a user of the system can select a connection to edit and specify an override to the ultimate destination of the connection. The system can achieve the override through various methods such as URL redirection in a web application, server redirection, domain forwarding, etc.

One aspect of the invention relates to counting clicks for connections. A click is any single instance of a visitation to the connection. Click counting can be implemented on the application level whereby a connection resource request causes a subroutine to be executed in which an integer stored in the database and related to the owning user of the connection is incremented. It could also be implemented at the web server level, whereby a server log of requests to a particular resource of an owning user is aggregated and counted.

One aspect of the invention relates to adding digital content to a unique landing page for a constituent. Digital content means any content in computer-readable format such as photo files, video files, audio files, text document files, text messages, screenshots, scripts, computer programs, news articles, gossip, blog posts, podcasts, forums, reviews, research articles, research publications, wikis, animations, games, game player-generated content, digital security certificates, and other such content.

One aspect of the invention relates to controlling privacy of the content associated with a connection. One way this could be implemented is by blocking access to all of the connection's content.

One aspect of the invention relates to serving personalized content to and engaging a constituent by displaying a unique constituent landing page to at least one constituent, said constituent landing page personalized for said constituent and said constituent led to said constituent landing page using a leave-behind. For example, when a campaigner visits a constituent at his house (perhaps as part of a canvassing walk route), he talks to the constituent and gathers information about the constituent in conversation, and then finally gives the constituent a leave-behind, which may be a palm card. Even before handing the leave-behind to the constituent, the campaigner himself may scan a QR code or follow a link on the card in order to personalize the landing page that the constituent will see if he visits the link. The campaigner would land on the constituent's landing page first, but on the constituent landing page there may be a special edit button for the owner of the landing page (in this case the campaigner). When the campaigner clicks this edit button on the constituent landing page, he may be prompted to verify credentials as the owner of the landing page before moving on. After verification, the campaigner would then be served with a campaigner landing page, where he may perform editing actions that personalize the constituent landing page.

At some point later, the constituent may scan a QR code or follow a link on the same card and be served with the constituent landing page that was personalized for him by the campaigner. The constituent may take various actions by passive connection on this constituent landing page. These constituent actions are then processed by the system. Processing these actions may be recording them in a database, analyzing the actions using some constituent action analysis algorithm, or other ways to meaningfully act upon the constituent actions. The system then can generate recommendations for increasing the personalization of the constituent landing page. These recommendations are usually a result of the inferences and other data derived from processing the constituent actions. The constituent actions may be combined with data already known about the constituent in order to draw more meaningful conclusions and recommendations for personalization. The recommendations may be actionable on the part of the campaigner, perhaps something manual that he should do such as call the constituent on the phone or visit the constituent at his house again, or perhaps send a personal written message to the constituent. The recommendations may also be actionable on the part of a computer system, in an automated fashion, such as sending an automated voicemail to the constituent, automatically sending a signal to a mail service to mail a certain campaign advertisement, or perhaps even automatically changing content on the constituent landing page and further personalizing it automatically in response to information gathered by the campaigner, either on the same landing page or elsewhere in association with the landing page.

Geo-Location of Connections

One aspect of the invention relates to geo-locating a connection. A connection can be considered "geo-located" when it is accompanied by, embedded with, or associated with geo-location coordinates such that one could use the geo-location coordinates to determine the spatial position in which the connection was made. Geo-location could also be used to determine where one is consuming content on one or more landing pages of a connection. An example of geo-location coordinates is the (latitude, longitude) pair system used by conventional GPS (Global Positioning Systems). Geo-location coordinates can also include elevation to produce the triplet (latitude, longitude, elevation), to further describe a spatial position. Another example of geo-location coordinates would be the triplet (latitude, longitude, heading), the heading in this case being a cardinal direction measured in degrees clockwise from North. Yet another possible example of geo-location coordinates would be the 4-tuple (latitude, longitude, elevation, heading). There are other ways to describe spatial position, such as by relation to another spatial position, acting as a reference point. Alternatively, one can use any combination of units of length (feet, meters, etc.), units of angle (degrees, radians, etc.), or other units, to describe a relation to a reference point. One of skill in the art will recognize many other ways to describe spatial position, all of which are within the scope of the present invention.

The ways of expressing geo-location described above can be modeled as n-dimensional mathematical vectors, where "n" is how many variables are taken into account in the vector. For example, the (latitude, longitude) pair of geo-location coordinates can be expressed as a 2-dimensional vector, whereby n=2. Extending that concept, the triplet (latitude, longitude, heading) can be expressed as a 3-dimensional vector, whereby n=3. In addition to the above mentioned geo-location coordinate sets that are possible, another vector configuration that bears mention is the 5-dimensional vector (latitude, longitude, elevation, heading, camera angle). Picking this apart, latitude and longitude may be the coordinates associated with the GPS (Global Positioning System). Heading may be the coordinate associated with the cardinal direction system. Common ways to measure heading are, for example, on the surface of the Earth, the clockwise angle measured from the North Pole in degrees or radians, or perhaps the same mode of measurement taking magnetic North instead of the North Pole as a reference point. Elevation may be the length above sea level, measured in feet or meters. Camera angle may be a measure of angle on any plane perpendicular to the plane used to measure heading. One such common ways to measure camera angle is the counter-clockwise angle from the plane used to measure heading, in degrees or radians.

A spatial position is a point in the space-time continuum as described by any physical model of space. For the purposes of understanding the invention, regard a spatial position as a "true position" in space-time that may be measured by various conventions. One convention may be the standard Euclidean three-dimensional space model of (x, y, z) distance from another reference spatial position, or perhaps a point (x, y) on a plane as defined by a standard Cartesian coordinate system. Another convention is the use of the 4-dimensional space-time model that extends the standard Euclidian 3-dimensional space model with the dimension of time: (x, y, z, t). One of skill in the art will recognize that there are numerous other models that can be applied, even ones incorporating concepts of general relativity or quantum mechanics, all of which fall within the scope of this invention. Geo-location, for the purposes of the invention, may also be extended to provide even more granularity in describing spatial position. The above mentioned 5-dimensional vector may be extended to include a time component in a 6-dimensional vector of (latitude, longitude, elevation, heading, camera angle, date time), whereby the "date time" component may itself be comprised of a sub-vector such as (year, month, day, hour, minute, second).

A spatial position generally corresponds to a unique set of geo-location coordinates, no matter what system or model the geo-location coordinates use, as long as the uniqueness comparison uses the same vector type and the same units of measurement for each vector component. This is generally true, otherwise the usage of that model of geo-location coordinates would be not be useful for measurement applications. However, it is recognized that there may be situations where one spatial position may correspond to multiple sets of geo-location coordinates, or vice versa, as might be the case in some general relativistic or quantum mechanical models related to space-time bending or the ability to simultaneously occupy two or more space-time points. For the purposes of understanding the invention, the embodiments described will assume that there is a one-to-one mapping between spatial position and geo-location coordinates.

Personalization of Landing Pages

A user of the passive connection system is commonly called a campaigner. This is because the term campaigner is often, but not always, given meaning from the campaigner's constituency, which can be a group of people that believe in and support the subject of a campaign that the campaigner is advocating. A campaigner may represent his constituency for some cause. The constituency may "follow" the campaigner for one reason or another, or vice versa. In any case, the campaigner is interested in engaging his constituency because that constituency is what gives the campaigner meaning for existence. A campaigner could be a political candidate running for office, in which case his constituency is the body of eligible voters that collectively have the capability for getting him into office in an election. A campaigner could also be the marketing or sales department of a major corporation, in which case its constituency includes the customers of the product or service being marketed or sold. A campaigner could be a single individual (in terms of marital or relationship status), in which case that campaigner's constituency includes people that the campaigner could potentially date. A campaigner could also be a service provider, in which case his constituency includes customers for that service. The service provider could be a lawyer whose constituency includes his clients or potential clients.

As described above a campaigner engages a constituency, so it follows that there must be individual constituents that are separate and distinct. Each constituent is expected to think, behave and act differently from other constituents even if they are part of the same constituency. Constituencies can be clustered and segmented into groups—for example, if the campaigner is a political candidate running for a Federal office, his constituency could be segmented into Democrats and Republicans. It is likely that the segmentation follows certain established frameworks, such as political party, gender, age, or other distinguishing factors and in light of those established frameworks, it is likely that constituents within the same cluster or group act similarly. No matter the framework of clustering or segmentation, each constituent is considered a free-thinking individual whose actions and engagement level with the campaigner is different from any other constituent's.

The passive connection system is most effective if connections and constituents have a one-to-one mapping. In other words, it is most effective when each constituent is associated with at most one connection in the system. However, there are cases when it is appropriate to associate more than one constituent to a single connection, and there are even cases when it is appropriate to associate more than one connection for a single constituent. For example, for the campaigner that is a political candidate, one connection may be associated with a potential voter and his whole family. This may be because the entire family has chosen, for some reason, to come to a consensus and to have each member cast the same vote. In this case, there is no need for a connection for each member of the family. In another example with the campaigner that is a political candidate, a single potential voter might be associated with more than one connection. One connection may be for interacting with the candidate on content related to the political issue of deep sea oil drilling, while another connection may be for interacting with the candidate on content related to the political issue of immigration.

A campaigner's engagement of his constituency is the metric that ultimately determines the effectiveness of his campaign. In the case when the campaigner is a political candidate, his goal may be to secure at least 100,000 votes on election day, in which case he must positively engage his potential voters. The more positively engaged his voters are with his campaign, the more likely they will turn up on election day to vote for him. In the case when the campaigner is a single male individual, his goal may be to get a date for the evening, in which case he must positively engage females to secure that date. Engagement may be relative, as a campaigner is often campaigning in competition against other campaigners in the same race and for the same or similar goals. The political candidate may have a political opponent and there may be other single individual males looking for a date for the evening as well. Engagement can be achieved by serving relevant and personalized content to a constituent.

Since constituents are treated as free-thinking individuals, it can be expected that any single constituent reacts differently to generic content from a campaigner. For example, a political candidate's video advertisement advocating abortion and pro-choice measures in hospitals may resonate well with constituent A who is a Democrat from Massachusetts, but may disgust and ultimately lose the vote of constituent B who is a Republican from Louisiana. For another example, a single male individual's photograph may attract female constituent C enough that she begins to communicate with him, but that same photograph may do nothing for female constituent D who is then not engaged. This generic content is also known as the "one size fits all" approach to constituency engagement.

One major aspect of the present invention involves the presentation of personalized content rather than generalized content, in order to raise the engagement level of either an individual constituent or the overall collective engagement level of all constituents for a given campaigner. The effect of personalization could, in the above examples, raise the engagement levels of constituent B (a voter who was disengaged solely on the political candidate's stance on abortion) and constituent D (a female who was not interested in a photograph presentation of the single male individual). Personalization involves a series of steps taken to increase the engagement level of a constituent who would otherwise be less engaged by or indifferent to generic content. Given a consistent engagement metric, the engagement "spread" between personalized content and generic content from the same campaigner should be positive for a particular constituent. In other words, a constituent should be more engaged with personalized content than generic content from the same campaigner.

Personalization can be achieved through configuration by the campaigner or a party related to the campaigner (such as the campaigner's employees, volunteers, friends, family, etc.) on a campaigner landing page. The campaigner landing page is a mechanism for configuring or programming the content shown to a constituent on a corresponding constituent landing page. A campaigner landing page and a constituent landing page would typically have a one-to-one mapping, but there are situations where one campaigner landing page can control content presentation on multiple constituent landing pages, or perhaps multiple campaigner landing pages may control a single constituent landing page. An example of a situation where one campaigner landing page controls multiple constituent landing pages is if the campaigner's engagement strategy was to show a particular constituent content in a certain order. The constituent could be shown the first landing page, which contains a promotional video. The constituent could then be shown a second landing page, prompting him to answer a question about how much he liked the first video. Then the constituent could be shown a third landing page, containing another promotional video. Finally the constituent could be shown a fourth landing page that prompts him to sign up for a service. This may also be called landing page "chaining."

The ordering or chaining of landing pages can also be configured to be affected by something conditional, such as a survey question. If the survey question was a yes or no question and the constituent answers no, the next landing page the constituent is served with may be a video related to a negative response to the survey question posed. Otherwise, if the constituent answers yes, he would be brought to a different landing page and served with different content.

The campaigner landing page would comprise the tools necessary to create this ordering of content presentation that would be implemented via the corresponding constituent landing pages. The campaigner landing page could also comprise the tools necessary to re-order the content presentation in response to more constituent data coming in at a later time. The campaigner landing page and all the constituent landing pages would be associated with the same connection data structure. An example of a situation where multiple campaigner landing pages control one constituent landing page may be when the constituent landing page is segmented into different sections, each specifically controlled by a different campaigner landing page. This may be set up in order for multiple associates (such as employees or volunteers) of the campaigner to take exclusive responsibility for content delivery in particular sections of the constituent landing page. The system may also implement varying permissions for each campaigner landing page, allowing only one party to edit the first campaigner landing page while allowing any party to edit the rest of the campaigner landing pages, all associated with the same constituent landing page.

Personalization does not necessarily have to be done manually by the campaigner or his associates. Personalization could be done automatically by a computer-implemented process of taking constituent data, analyzing it and drawing various conclusions that then change the presentation of content on constituent landing pages. This automated or machine-implemented personalization could be achieved through the implementation of a rules engine, whereby any single rule may fire off certain personalization actions depending on the data inputs. There are various commercially-available rules engines that could be used as off-the-shelf components in this part of the passive connection system. Machine-implemented personalization could also be achieved through the implementation of a machine-learning algorithm that adapts to both the constituent data and the performance of the system over time. The performance of the system could be recorded as other data, such as a determination of how much more engaged constituents became in response to a particular constituent landing page personalization strategy. Machine-implemented personalization could also be achieved through the implementation of an evolutionary algorithm that may be similar to the adaptive machine-learning algorithm but that also involves evolutionary processes such as datum survival and selection, datum response to environmental factors, competition between datum for significance in personalization strategy, or even random or deliberate mutations on constituent data.

One or more metrics may be used to determine the level of engagement a constituent has for a campaigner. One simple metric may be a binary metric, whereby the constituent is either engaged or not engaged. This could be measured by, for example, whether or not the constituent buys a product from the campaigner. If the purchase happens, the constituent is marked as engaged, and if not, the constituent is marked as not engaged. Another possible metric may be how many times a constituent visits a landing page for a connection. If the constituent and connection data structure have a one-to-one mapping, the metric would be a very useful determination of the engagement level of a single constituent. The more times the constituent clicks through to the connection landing page, the more engaged that constituent is. A dynamic scale could then be developed to normalize the engagement of a constituent against the engagement of the constituency as a whole. For example, one could determine that voter A is 4 clicks more engaged than voter B with a political candidate, or perhaps that voter A is 2 clicks more engaged than the average potential voter for the political candidate. Another possible metric for constituent engagement may be the actions that a constituent takes on a landing page. For example, clicking a "Join" button on a constituent landing page may indicate a much higher constituent engagement level than clicking a "See More Information" button. A constituent that spends an average of 5 minutes on his constituent landing page may register as being more engaged than a constituent that spends an average of 30 seconds on his constituent landing page.

Various other information can be gathered on a constituent landing page. For example, each time a constituent visits a constituent landing page, a timestamp and GPS location could be taken to determine when and where the visit took place. Aggregating or analyzing this information could draw insights into the constituent's behavior and may even draw inferences as to the constituent's engagement level with the campaigner. This information could be used to drive the campaigner's engagement strategy. For example, if the campaigner is a political candidate running for mayor of New York City, analysis of GPS location data for constituent landing page visits could conclude that the candidate boasts high engagement levels by constituents in the Bronx, but scores low engagement levels by constituents in Brooklyn. He may then use that information to change his campaign strategy, putting more effort into communicating and posting ads in Brooklyn to make up for his weak engagement levels there. As another example, analysis of timestamp data for constituent landing page visits could conclude that the candidate gets high constituent engagement during the early afternoon but gets low constituent engagement in the evening. The candidate may then use that information to change his campaign strategy, doubling the staff of campaign volunteers placing calls in the early afternoon and reducing the staff of campaign volunteers placing calls in the evening. A combination of that data could also be analyzed and conclusions drawn from the analysis. Any single piece of data in this regard, whether numerical or lexicographical, express or implied, or whatever the format, is considered a constituent datum.

Usage of the passive connection system may involve physical actions. A campaigner may speak with a constituent in person and during that live interaction a new connection data structure could be created in the passive connection system's database or an existing connection data structure re-configured to be associated with that constituent. This may be done through the use of a mobile device running part of the passive connection system, having read/write access to the system's database, directly or indirectly, possibly through accessing a campaigner landing page. With the mobile device, the campaigner could record various initial constituent data such as name, age, height, date of birth, current geo-location or address, a timestamp, free-form notes about the constituent, or other such data. This initial constituent data could be recorded within the connection data structure or possibly in another data structure associated to the connection data structure. In any case, that constituent data could at any point later be cross-referenced with a connection.

Leave-Behinds

The campaigner may give the constituent a leave-behind. The leave-behind is something that aids or provides the basis for the dynamic engagement of the constituent and is something the constituent possesses and keeps after the interaction with the campaigner. The leave-behind may be physical or electronic. An example of an electronic leave-behind is a browser cookie that saves preferences or other data related to the constituent and accessible by the campaigner. Examples of physical leave-behinds could be a business card, palm card, sticker, postcard, or other such objects. Leave-behinds exhibit some expression of a unique link, which may bring the constituent to a constituent landing page. For a browser cookie, it may be a text line that references the constituent landing page URL. For a business card or palm card, it could be the textual representation of the constituent landing page URL or a QR code representation of the same.

When the leave-behind is a physical component of the system, one aspect of the present invention is a process for printing the unique codes or URL's on print media. When printing these on business cards or palm cards, a section of the card could be reserved for a unique code, URL or QR code, or any combination thereof. One of skill in the art could then write a script that takes an image template for printing and watermarking text (such as the URL) or superimposing an image (such as the QR code) that is different on each card. Print media may refer to business cards or palm cards, but it could also be stickers, tags, t-shirts, or any other physical component that can represent a unique code of any sort. One of skill in the art will recognize that this contemplates pretty much anything in the universe.

Without any initial data in or associated with the connection, the connection is a virtually meaningless empty shell, so this initial data is essentially how the connection is born even if the empty data structure already existed before the injection of data. This connection (with initial data) could then be meaningfully combined later with constituent data collected when a constituent visits a constituent landing page. This combination of data would then be more powerful for driving personalization strategy. The passive connection system is a mechanism to combine initial connection data (gathered at the stage of canvassing or first meeting a constituent) with data that is later gathered through constituent engagement actions, such as when a constituent visits a constituent landing page configured by the campaigner. As more constituent data is gathered through these actions, the passive connection system can automatically, or with manual intervention from the campaigner, evolve the personalization of the constituent landing page. This creates an iterative process whereby each new constituent datum collected can be used to further personalize the constituent landing page, which in turn increases engagement of the constituent and leads to more constituent data collection.

System Architecture of the Present Invention

FIG. 1 is a block diagram of an exemplary system 100 for passive connection personalization, in accordance with one embodiment of the present invention. The passive connection system 100 may correspond to but is not limited to being a computer system such as a desktop, laptop, tablet PC, handheld mobile device and the like. The passive connection system 100 includes a user interface 102, central processor 104, global positioning system 106, a cloud or network connection 108, a memory unit 110, a connections management routine (machine-executable instructions) 112, and a connections database 114.

When the system is in operation, the memory unit 110 is loaded with one or more routines such as the connections management routine 112. Other sorts of data structures and instructions can be loaded into the memory unit 110 in conjunction with or separately from connections management routine 112. While the system is in operation, data can be loaded into this memory unit 110 ad-hoc, perhaps as a result of a data caching operation or other operation that requires such placement of data.

The processor 104 is a hardware component configured to execute instructions and carry out operations associated with computer system 100. Examples of such a processor could be a CPU of any architecture (CISC, RISC, EDGE, 8-bit, 32-bit, 64-bit, etc.), a combination of CPU's of any architecture performing operations in parallel, a combination of specialized CPU's such as a microcontroller coupled with a digital signal processor, the hardware of which is efficiently designed to process certain signals (such as graphics in a GPU), or perhaps a vector processor, or any other processing device that can carry out the task of executing instructions and carrying out operations associated with verification system 100.

FIG. 2 is a flowchart diagram of a method 200 for serving personalized content, in accordance with one embodiment of the present invention. This method of serving personalized content is best executed on a network-enabled computer system. The method 200 starts with step 202 and proceeds to step 204, whereby a unique connection, a unique campaigner landing page and a unique constituent are provisioned in a connections database. The method 200 may proceed to step 206, whereby the unique connection is associated with a first constituent datum in said connections database, said first constituent datum received through the campaigner landing page. The method 200 may then proceed to step 208, whereby said constituent landing page is personalized in response to a combination of said unique connection and said first constituent datum. The method 200 may then proceed to step 210, whereby said unique connection is associated with a second constituent datum in said connections database, said second constituent datum received through the constituent landing page by passive connection. The method 200 may then proceed to step 212, whereby said constituent landing page is further personalized in response to a combination of said unique connection, said first datum and said second datum. Finally, the method 200 ends with step 214.

Constituent and Campaigner Content Distribution System

Another aspect of the present invention is a content distribution and replication system that has the effect of personalization of a message. A system can be architected to drive visitor engagement using a passive connection model and personalization rule sets derived from applying evolutionary algorithms, scalable to web networks of any size.

In the example of a political campaign, a point person for the campaign works with the passive connection system to profile the campaign's efforts and to identify the locations that they wish to target for the initial launch of their campaign. The point person identifies the first of the initial sites where they will launch the passive connection system. This will typically be a college campus where the campaign has a strong group of volunteers in place. Once the first site is selected a workshop could be scheduled.

The workshop is where the passive connection system is refined for the specific use of the campaign. Additionally, candidates from the same political party may wish to combine their workshops for savings in time and money. Below is an outline of what take place during the workshop. Following the outline will be a detailed explanation of each phase of the workshop:

(1) Introduction to Campaign(s)—During this phase of the workshop the campaign or campaigns are introduced (2) Introduction to the passive connection system—During this phase of the workshop the attendees are given an overview of how the platform works and how they'll be using it (3) Passive connection system Administration and Processes—This is the first substantive phase of the workshop. During this phase the attendees will be assigned roles and duties. Those attendees with roles as administrators and will be trained on managing the various accounts of canvassers. Administrators will also be taught how to read the dashboard and understand data that is collected. Attendees will be shown how to program the platform's content and the process for making additions and changes to content (4) Lunch (5) Brainstorming Session—After lunch, the attendees will break into small groups. In these groups they will brainstorm about what campaign messages resonate most with them. They'll discuss which messages would be most compelling to their peers. They'll work on coming to a conclusion on how best to characterize the campaigns message for the demographic they'll be canvassing. The small groups will then share their findings with one another.

(6) Issues and Positions Refinement Session—During the final substantive phase of the workshop, the attendees will review the results of the brainstorming session to come to a conclusion on what issues they care about most, what issues they feel their peers will care about most, and ultimately ensuring that they all have the same understanding of the campaign's position on the relevant issue.

(7) Review Action Items—This part of the workshop shall end with the group agreeing upon action items to complete in advance of the following part of the workshop. These action items will be for some attendees to create their own video wherein they will present an issue that they care about and discuss briefly the position of the campaign on the issue and why that makes them support the candidate. These videos will be used as examples during the Video Production Party. Any disagreements over the position of the campaign on issues which the majority of attendees have deemed to be relevant will be assigned to the campaign's point person to be resolved with the candidate before the following day's workshop begins (unless the candidate himself/herself is present). Attendees will be asked to continue to invite their friends and confirm previous invitations to the Video Production Party that will happen in the next part.

(8) Example Video Review—Attendees that were asked to make example video will take turns showing their videos. The group will then give each video producer their feedback. The best videos will be selected to be shown as examples during the Video Production Party. New videos can be filmed at that time based on feedback if necessary to have adequate examples to show at the Video Production Party.

(9) Lunch/Video Production Party—The Video Production Party will be an event open to guests that the attendees have invited in hopes of getting them engaged with the campaign. While eating pizza and snacks the attendees can take turns recording videos wherein they discuss an issue that they care about and why they support the candidate's position on it. The best video will be featured on the campaign's main site.

(10) Launch—During the party, those attendees that have already received cards can canvass their guests and direct them to a personalized portal which they have created for them and which will feature one or more of their new videos.

After this initial workshop and launch process, the distribution from the initial set of content creators (in this case the student political leaders who interface directly with the campaign, making videos as content) then reaches their immediate network, which is a sub-constituency of the full campaign constituency. For a student leader, this immediate network could be his group of friends on campus. It could also be any member of the school at which he is matriculated. In any case, this immediate network is a sub-constituency that is closely connected to the student leader distributing the content. The content is endorsed by the campaign, but ultimately the content's creator is the student leader, so the relevance of the content to the student leader's immediate network is much higher than any content produced by the campaign itself would have been. For example, if the student leader's friend watches a video that he made, he will likely engage with the video because he is watching his friend and it is more fun and relevant. Within the student leader's immediate network, there may be other students or members of the community interested in the campaign message spread through that student leader's own words. These others then create their own content that spreads a certain tenet of the campaign. For example, if a pro-choice view on abortion is a campaign tenet that resonates with an individual who consumes campaign-endorsed content made by his friend, that individual would then create his own content, get it endorsed by the campaign through an approval process set up for the campaign, and order a set of leave-behind palm cards from the campaign to distribute his version of the campaign's message to his immediate network. This process goes on and on for multiple generations.

The passive connection system can guide this method of controlled content replication and distribution. On its merits, the method resembles an evolutionary process in which evolutionary concepts such as survivability of the campaign message through content replication among many generations, mutations of that campaign message through creating personalized versions in another's own mode of expression, environmental factors such as local/current events that content must be adapted to, competitive factors like opposing campaigns doing content replication in the same network, and inheritance of traits and other features that must be present to comply with the campaign message through the campaign approval and endorsement process, are all present. The system can be modeled and predictive conclusions determined by means of an evolutionary algorithm that takes into account all these factors along with data collected to measure engagement throughout all generations of this content distribution and replication system. Content replication can cause variants from mutations like in genetic processes. In this case, the genes that typically are associated with the mutations are instead memes—each mutation of the meme is a necessary component of the system to achieve personalization because without the mutation the content would be generalized and would not appeal to particular groups of constituents.

Another aspect of the present invention is a method for increasing trust in a constituency by offering a middle ground in terms of personal information divulgence. Currently, most systems that endeavor to increase engagement of a constituency give users a binary choice. Only two extremes are offered—divulge personal information and get personalized content, or don't divulge personal information and receive no personalized content. Trust can be established with a constituent when it is communicated through the leave-behind card, verbally, or by other means that a constituent's personal information will not be required, that the system learns of the constituent's preferences without real-world identification or cross-reference.

Another aspect of the present invention is a method for incentivizing constituent engagement using a reward system. The reward referred to in this incentivizing method is not necessarily a monetary reward but could be redeemable virtual points or even virtual points that have no value whatsoever in the real world. It could also be something as simple as a display of positive feedback. Messages would be displayed on the leave-behind card that communicate the reward or possibility of reward clearly to a constituent. For example, a message such as "scan this QR code to be entered for a chance to dine with the Presidential candidate" may draw a significant clickback response among a candidate's constituency.

Another aspect of the present invention is a method for incentivizing constituent engagement by performing steps to increase intrigue or curiosity. In the example of a dating service built using a passive connection technique, intrigue can be built among a constituency by reducing the amount of information printed on the leave-behind card. For example, a card that simply has a picture of the campaigner in addition to a unique link and unique QR code would elicit a clickthrough in many cases through curiosity alone. In the case of business networking, if the leave-behind card is shaped like an envelope and a printed message such as "enclosed are important documents for your review," the system would likely elicit more clickthough engagement as a result of the constituent wondering what was waiting in the envelope for him.

There are many possible uses for the personalization systems and methods of the present invention. A salesperson could use this system to identify the most engaged customers and put them at the top of the list to call or upsell. He could also identify the customers who care the most or have the most at stake with a product or service. An alumni donations group or political candidate could use the system to identify donors who donate most or most often, so that they can be placed at the top of a call list. A political campaign could also use the system internally to identify, within their set of campaign volunteers, which ones are the "A" players getting the most engagement from the potential voters that they have canvassed. When the analytics show a significant increase in engagement (controlling for other factors) from constituents that were canvassed by a particular volunteer, it stands to reason that that volunteer must be doing something right.

One embodiment of the present invention is a service for a political candidate to connect with voters. It allows a campaigner to connect with a voter after first meeting them in person. It does this through a "palm card" which includes a unique web address and QR code that link to a personalized landing page set up for each individual voter. This would be a service where the political candidate can use printed cards to personalize his interactions with voters, program a series of questions for the campaigner or his volunteers to ask voters when they're out working for the campaign door-knocking or at campaign events, conduct the campaign's own polling to determine to what degree voters support the campaign and what issues they care about most, visualize where the political candidate's supporters are and where undecided voters are, personalize the campaign for individual voters, and manage relationships with voters. Political candidates must connect with voters on a personal level to get elected, as it is difficult to track individual interests and positions of voters and polls are generalized and do not provide actionable insight. The passive connection system makes it easy and possible to do all of the foregoing. Using this system, a political candidate can connect voters on a personal level, find out what they care about and conduct a more successful campaign.

Accordingly, FIG. 3 illustrates a sample of a user interface for managing a plurality of constituent connections, in accordance with an embodiment of the present invention. What is shown is the first page of a paginated list of available connections that is available to the campaigner, but not any constituent. Those connections that do not display a name are open connections (they have not been used) while those that display a name are used connections. Associated with each connection is a count of the number of clicks and a count of the number of messages. Finally, each connection is uniquely accessible by the unique QR code shown, which is a 2-d embodiment of a unique URL. Each connection has its own unique URL and QR code.

FIG. 4 illustrates a sample of a screenshot of a user interface for filling in points of identity of a constituent as that information is revealed during contact with the constituent, in accordance with one embodiment of the present invention. This is part of a series of campaigner landing pages. In this embodiment, a Profile tab is open for capturing data for a connection, which is available to the campaigner, but not the constituent. The connection shown represents an individual constituent named John Wayne with an e-mail address at john@wayne.com, along with other personal information (under the Basic Information header) that is captured during a live interaction with John Wayne. Under the Political Information header, there is an interface that allows a campaigner to capture political information about John Wayne that is discovered during the live interaction with him. In this case, he is identified as a Democrat and he has already decided on voting for candidate Walter Plant.

FIG. 5 illustrates a sample of a screenshot of a user interface for mobile canvassing on a voter constituency, showing instructive scripts to be read or articulated to the constituent and elements to record information about the constituent, in accordance with one embodiment of the present invention. This is part of a series of campaigner landing pages. In this embodiment, a Canvass tab is open for capturing data for a connection, which is available to the campaigner, but not the constituent. This tab is designed for a campaigner to reference during a live interaction with a constituent, and is ordered in such a way to guide the campaigner through the live interaction. The campaigner's canvass begins with reading what's written in the Opening Script to the constituent, then asking whether the constituent would like to support the candidate in different ways available, and capturing their response. Then the campaigner is instructed by this display to ask the constituent how likely he or she is to vote for the candidate, which is captured by the campaigner on a scale of 1-5. The campaigner can either explicitly ask the constituent to rate his likeliness to vote for the candidate on a scale of 1-5, or the campaigner may ask more generically and then map to the scale himself. Below this point in the sample interface, there are a number of issues presented for the campaigner to ask the constituent their level of agreeability with. For example, a campaigner may ask "Are you concerned with issues related to renewable energy?" to which the constituent may reply "No, I am not." In this case, the campaigner marks "No" to capture that piece of information that is valuable to the campaign.

FIG. 6 illustrates a sample of a screenshot of a user interface for personalizing the landing page for a constituent, in accordance with one embodiment of the present invention. In this particular figure, a personal message is written to the constituent. This is part of a series of campaigner landing pages. In this embodiment, an Interactions tab is open for capturing data for a connection, which is available to the campaigner, but not the constituent. This tab is offered for the campaigner to be able to write the uniquely personalized message that will when the constituent visits the same URL or QR code.

Figure 7:
FIG. 7 illustrates a sample of a user interface widget for capturing information about a meeting with a constituent, in accordance with one embodiment of the present invention.

FIG. 7 illustrates a sample of a screenshot of a user interface widget for capturing information about a meeting with a constituent, whereby geo-location and timestamp are recorded, in accordance with one embodiment of the present invention. This is part of a series of campaigner landing pages. In this embodiment, there is not yet any information captured for time or location, but once they are captured, a time stamp (ex. "2012-03-02 10:42:15") may be shown next to the "When:" element, and a GPS location (ex. "37 23.516, −122 02.625) may be shown next to the "Where:" element. There may also be respective buttons next to "When:" and "Where:" which when clicked, allow the user to opt-in for the landing page to capture the current time or their current location. Finally, the display of a time may also include time zone information as well as other meta information related to the display of time, and the display of a GPS location may also include a link to jump directly to a map interface for that location, as well as GPS accuracy estimates (ex. "+/−1%") or even a human-readable translation of the coordinates (ex. "near Bakersfield, Calif.").

Figure 8:
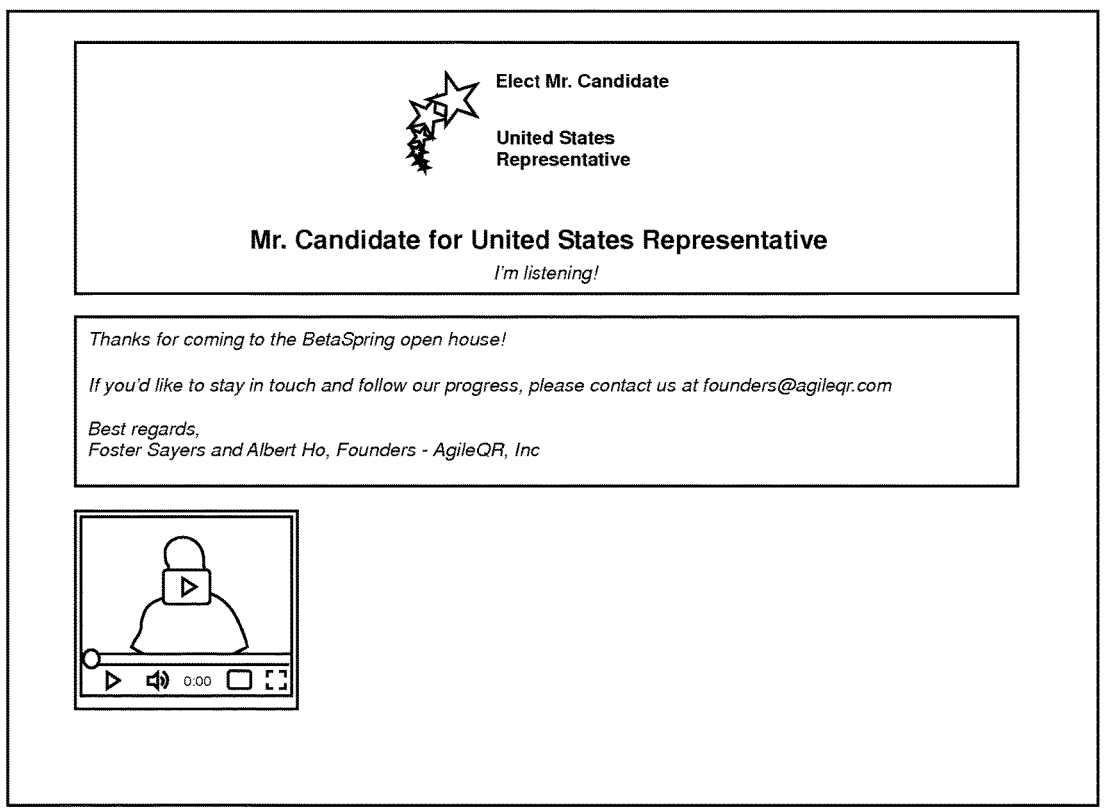
FIG. 8 illustrates a sample of a user interface for a constituent landing page for a candidate for a public office, in accordance with one embodiment of the present invention.

FIG. 8 illustrates a sample of a screenshot of a user interface for a constituent landing page for a candidate for a United States Representative office, in accordance with one embodiment of the present invention. The personalized content it includes is a personalized message and video. In this embodiment, the candidate's logo and other information is displayed first in order to brand the page and identify the candidate presenting the information. This landing page then proceeds to show the personalized message that is contextualized to the situation in which the candidate's representative met the constituent. In this case, the message reminds the constituent that he met with a campaigner at the "Betaspring open house" and makes a slight suggestion that the constituent follow the campaign's progress and offers a way to do so. After the personalized message, a personalized video is displayed that is related to what the constituent cares most about. What he cares most about may have been discovered during an initial conversation with him, in which case that data was captured by the campaigner, and the system automatically serves the correct video based on that data.

Figure 9:
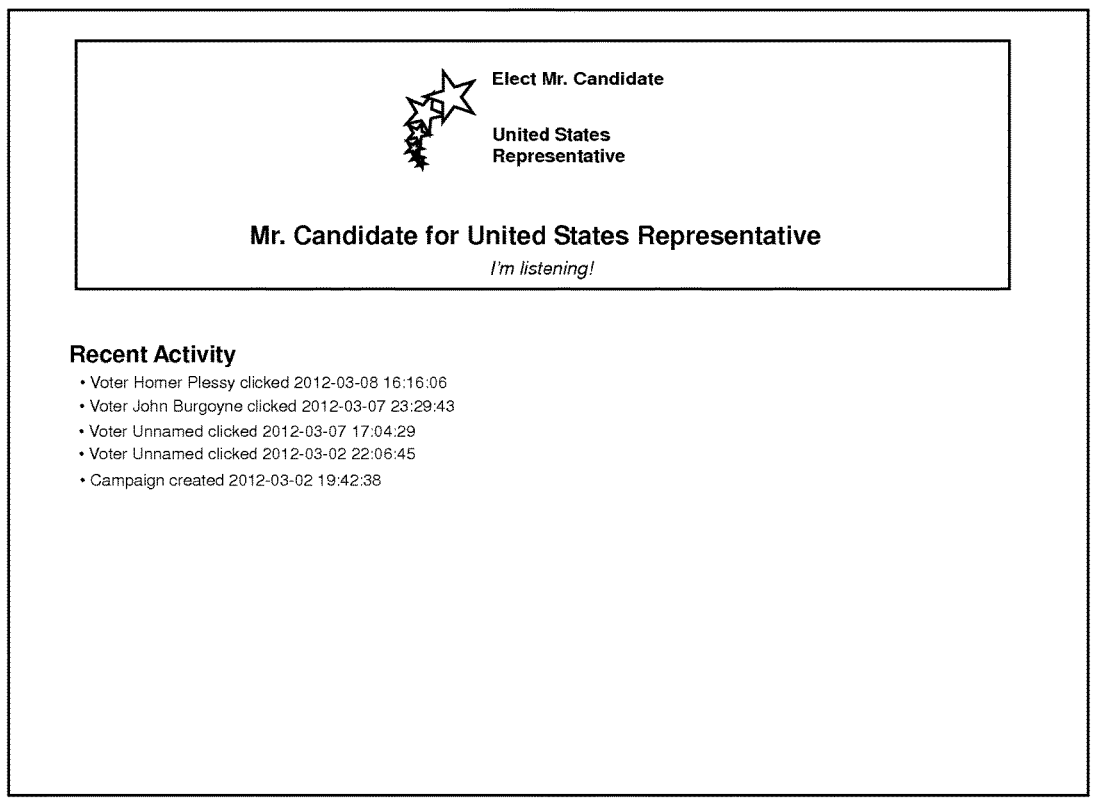
FIG. 9 illustrates a sample of a user interface for a campaigner's dashboard, in accordance with one embodiment of the present invention.

FIG. 9 illustrates a sample of a screenshot of a user interface for a campaigner's dashboard, in accordance with one embodiment of the present invention. In this figure, the candidate can see recent clicks on his campaign palm cards. This display shows recent activity in reverse chronological order, which is available to the campaigner, but not to the constituent. There are five points of recent activity displayed for the campaigner to review, four of which are clicks by constituents on their individual URL's. The final (and earliest) activity point is the creation of the current campaign for Mr. Candidate.

Figure 10:
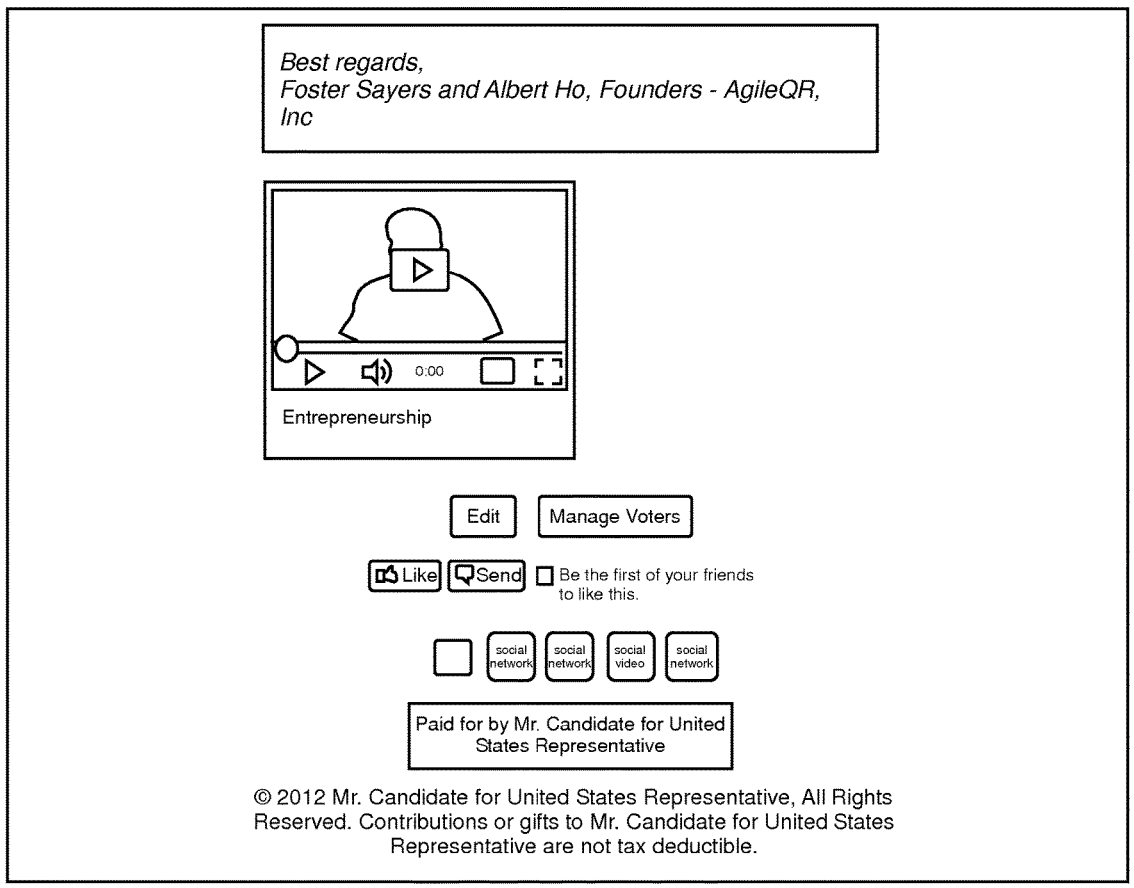
FIG. 10 illustrates a sample of a user interface for a constituent landing page for a candidate for a public office, in accordance with one embodiment of the present invention.

FIG. 10 illustrates a sample of a screenshot of a user interface for a constituent landing page for a candidate for a United States Representative office, in accordance with one embodiment of the present invention. In this figure, the campaigner is logged in and is given an "Edit" button as an option to jump to a campaigner landing page to configure the current constituent landing page. The campaigner also has the option to "Manage Voters," which when clicked brings him to a user interface for managing a plurality of constituent connections. In this embodiment, both of these buttons would not be available if the client of the URL were not signed in as one of the campaigner accounts that either owns or has the appropriate level of access rights to this particular landing page.

Figure 11:
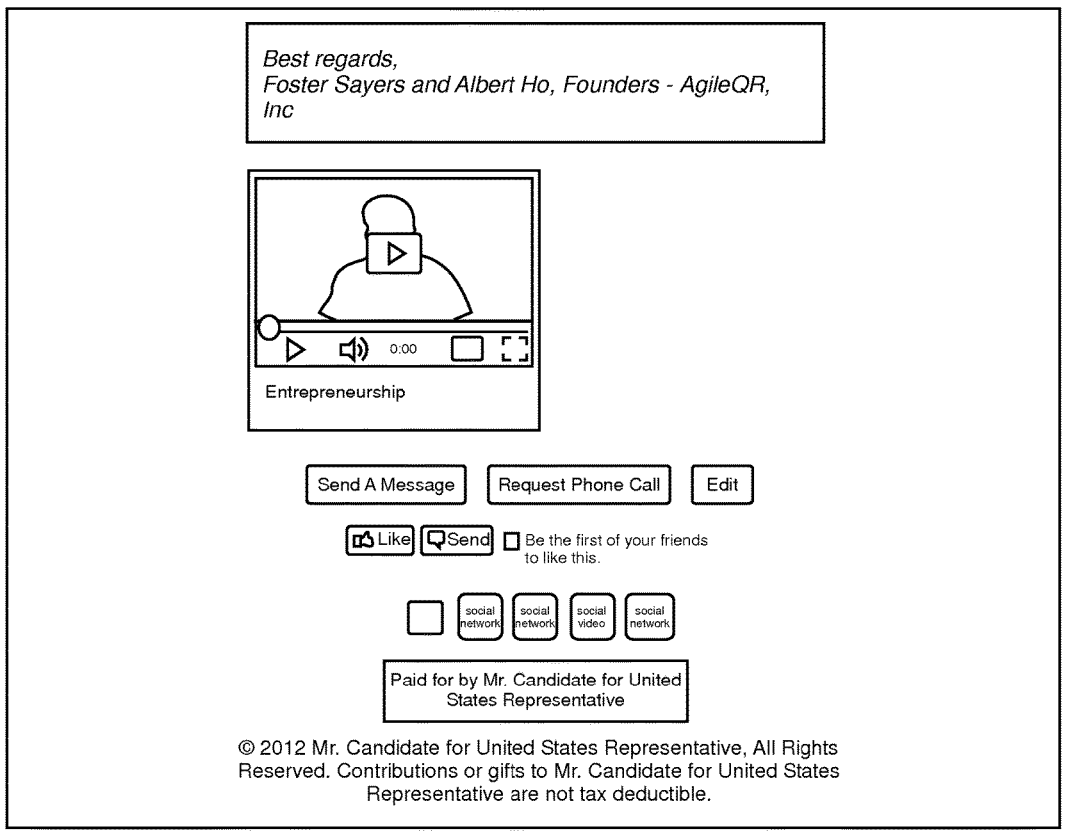
FIG. 11 illustrates a sample of a user interface for a constituent landing page for a candidate for a public office, in accordance with one embodiment of the present invention.

FIG. 11 illustrates a sample of a screenshot of a user interface for a constituent landing page for a candidate for a United States Representative office, in accordance with one embodiment of the present invention. In this figure, the campaigner is not logged in, so it is presumed that a constituent is viewing the page instead. When the "Edit" button is clicked, it will prompt the current user to log in. If the current user is the campaigner trying to get back into his own account with the passive connection system, he can log in and configure the current constituent landing page. If the current user is not the campaigner, but is instead the constituent, he will not be able to log in. In this embodiment, even if the client of the URL is not a campaigner that has the appropriate level of access rights to this particular landing page, the client is still given the "Edit" button in case he actually is but just has not logged in to the system yet.

Figure 12:
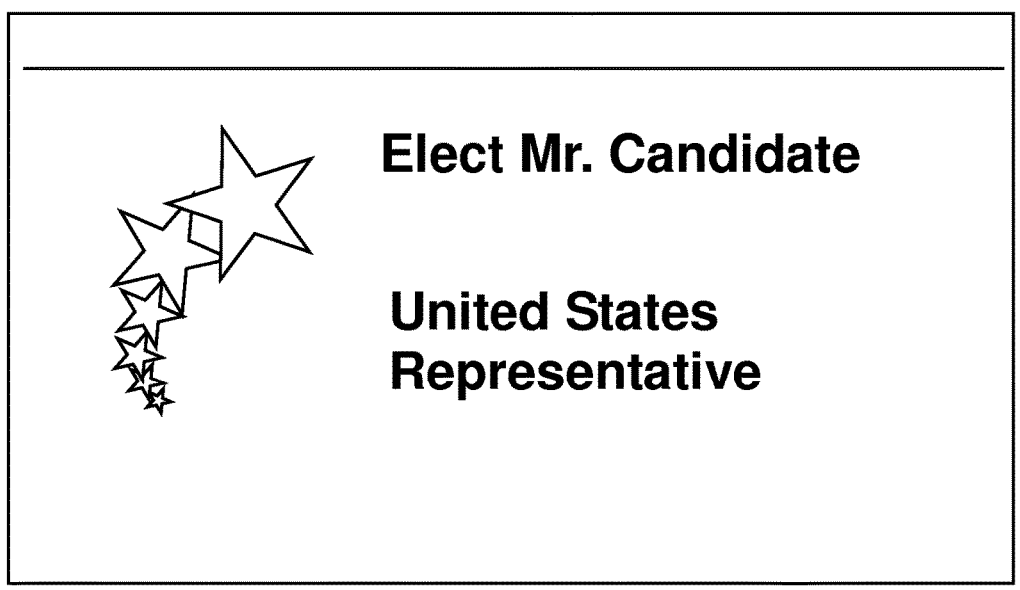
FIG. 12 illustrates a sample of a front side design of a political campaign palm card for a generic unnamed candidate in the passive connection system, in accordance with one embodiment of the present invention.

FIG. 12 illustrates a sample of a front side design of a political campaign palm card for a generic unnamed candidate in the passive connection system, in accordance with one embodiment of the present invention. In this embodiment, the front side design simply shows the logo of the candidate in order to spread his brand message.

Figure 13:
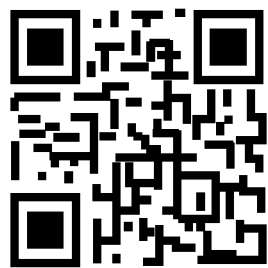
FIG. 13 illustrates a sample of a back side design of a political campaign palm card, in accordance with one embodiment of the present invention.

FIG. 13 illustrates a sample of a back side design of a political campaign palm card, in accordance with one embodiment of the present invention. It contains a unique shortened link, a unique QR code (that is a QR representation of the unique shortened link), and a short message to the constituent. The message may just be generic message or could suggest that the constituent to visit the link.

New Relationship Connections

Another embodiment of the present invention is a service for making new acquaintances into ongoing relationships and for sharing information with the previously unknown person. It starts with a primary user that is using the passive connection system. The primary user provides the secondary user with a unique code, such as a QR code on the back of a card. Before the secondary user is given the unique code or at any point thereafter the primary user may change the content to be disseminated to the secondary user.

The following scenario is an example where the passive connection system can be used when people are transiently connected. The primary user (hereinafter "Prime") meets the secondary user (hereinafter "Second") at a sporting event. Second approaches Prime because he notices that Prime is using a digital camera to film the event. Second is without a camera and hopes that Prime will share his photos of the event. Prime knows that this can be easily arranged. Prime scans a unique QR code on one of his passive connection cards, and gives the card with the code on it to Second. Prime then customizes a landing page specific to the code just given to Second. Prime changes his introductory text to address Second directly and selects the contact and social network information that he wants to share with. At the end of his custom message for Second, Prime states, "P.S. check back tomorrow and I'll have a link to the pictures for you." The following day after Prime is done uploading his photos from his digital camera he then adds the link to pictures that he took of the sporting event that he wishes to share with Second. Second can then scan the very same QR code that was initially given but see the new content that includes the link to the sporting event pictures.

Another embodiment of the present invention is a gift conditional upon a subsequent expression of interest. This will be a revival of chivalry. Conditional gifts can be setup using the passive connection system. This feature allows users to be romantic without committing them to make a purchase before knowing that the person they're trying to romance is at least somewhat interested. A user can select a gift of flowers. The recipient of their card not only clicks the unique code on the card but also clicks to accept the gift and enter their shipping information. This allows the primary user to be romantic without worrying that his gesture might be wasted on someone that has no interest in him whatsoever.

Another embodiment of the present invention is a system for businesses that deals with customer feedback, customer behavior tracking, and targeted promotions. This system would allow businesses to maintain a connection to their customers in order to receive customer feedback and promote further business. Presently, businesses' primary means of communicating promotions to customers are typically printed flyers that are distributed to customers on site and in local neighborhoods, advertisements in printed circulars, and email communications to customers that choose to subscribe. Similarly, businesses' primary means of getting customer feedback is through printed materials on site or email communications. The passive connection system offers an alternative means to all of the foregoing which has the added benefits of tracking customer interactions and intelligently promoting the business in a customer-specific way.

Using the passive connection system, businesses provide a code printed on a coupon to their customers. The customers scan or input the code into an Internet browser and are then taken to the business' landing page. There the business will typically thank the visitor for their patronage and then provide a customer feedback survey, present coupons and/or feature promotional material. The foregoing can be done in one or a series of landing pages. Businesses can track how many times the visitor clicks on the coupon code and can update the customer's landing page with their current promotions after each click over time. This provides the customer with a means to receive updates and offers from the business at their initiative and convenience as opposed to traditional means, which are disseminated to the customer at the business' initiative and convenience.

The advantages of the passive connection system over traditional means of business promotion and obtaining customer feedback are many. One advantage lies in the fact that a business can provide a customer with a code one time and yet still provide multiple offers over time. It is more effective than the method of sending email as subscribing customers may have the emails routed to their junk mail folders or may have them auto-archived where they are not actually read; whereas the customer must be interested in reviewing current offers if they have chosen to use the code again. Another advantage is that the tracking feature allows businesses to provide more targeted customer promotions and surveys.

Another embodiment of the present invention is a system for businesses that deals with lead generation, lead tracking, lead qualification and networking effectiveness. This would allow businesses to generate leads, track leads, qualify leads and monitor the effectiveness of networking efforts. The passive connection cards can be scanned at networking and sales events before they are given to a prospective customer. This allows the business to not only create a new lead but also to get information as to the date, time and location that the lead was first generated. The business can then track whether the prospective customer subsequently clicks on the code they've received. The business can then qualify the lead based on the prospective customer's behavior once they have clicked the code and arrived at the landing page created for them. The ability to see who is getting the most leads and where they are getting them will allow businesses to better gauge the effectiveness of their networking efforts at both an individual and event level as the leads that are generated will have information as to who made the first contact with the customer and at which event. This data can allow businesses to better plan which individuals to assign to which events.

Figure 14:
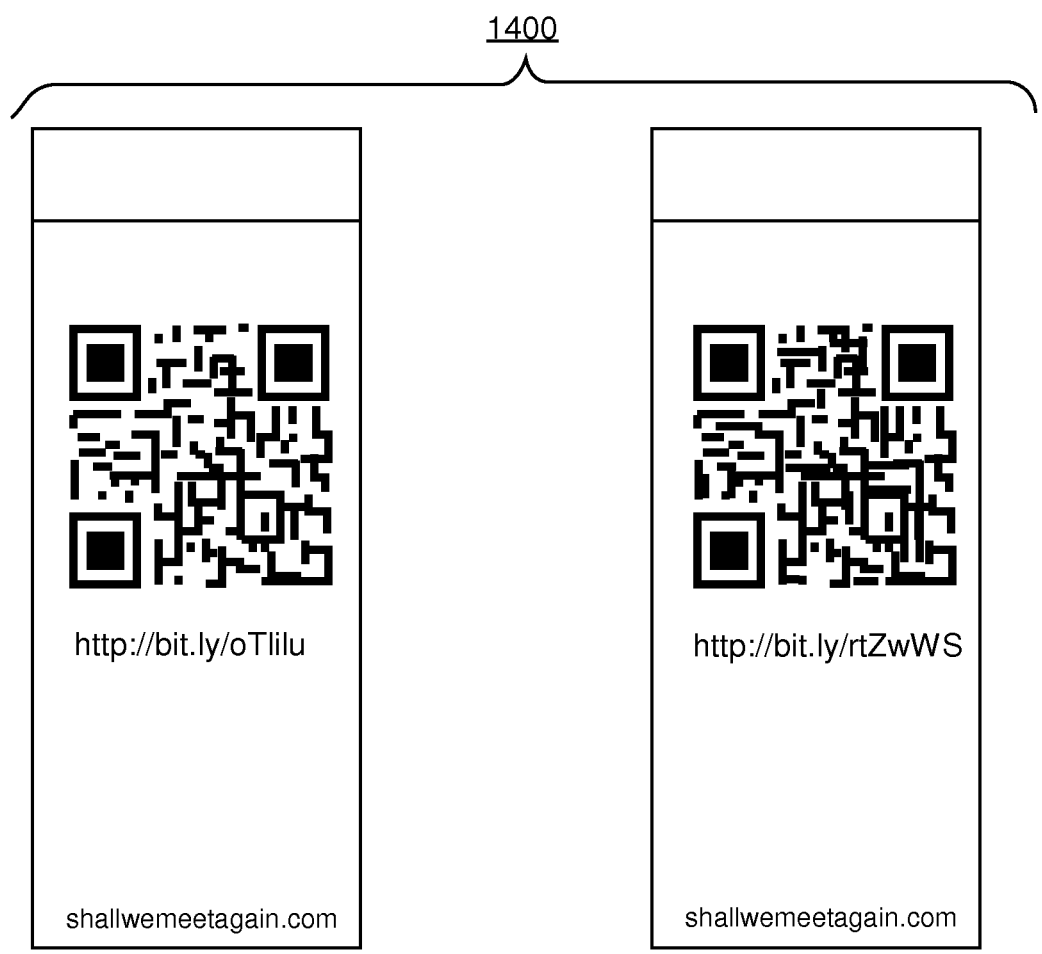
FIG. 14 illustrates a sample of a back sides of two dating cards, in accordance with one embodiment of the present invention.

Accordingly, FIG. 14 illustrates a sample of a back sides of two dating cards, in accordance with one embodiment of the present invention. They each contain their own unique shortened links, their own unique QR codes (that is a QR representation of the corresponding unique shortened link), and a link to the passive connection system deployment. Additionally, there may be other human-readable text that could be a printed message or even a suggestion that the recipient of the dating card visit the link to reveal a hidden message or other content.

Figure 15:
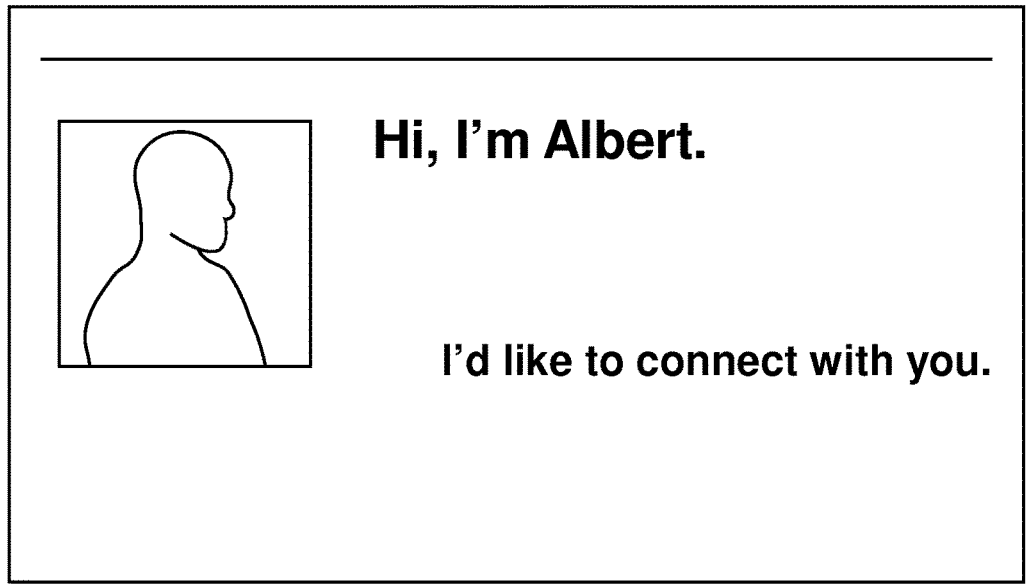
FIG. 15 illustrates a sample of a front side design of a card that can be used for dating or business networking, in accordance with one embodiment of the present invention.

FIG. 15 illustrates a sample of a front side design of a card that can be used for dating or business networking, in accordance with one embodiment of the present invention. It contains a photo of the campaigner, a name introduction, and a simple message showing interest in the constituent. The message may even suggest that the recipient of the dating card turn the card around to reveal his or her personalized link.

Figure 16:
FIG. 16 illustrates a sample of a design of a card that can be used for dating or business networking, in accordance with one embodiment of the present invention.

FIG. 16 illustrates a sample of a design of a card that can be used for dating or business networking, in accordance with one embodiment of the present invention. It contains a photo of the campaigner, a named introduction, and a simple message showing interest in the constituent. It also contains instructional text suggesting that the constituent take action, along with a unique shortened link and its corresponding QR code. It also contains an area of white space where the campaigner can physically write a personalized message directly on the card. In this embodiment, all of the generic and personalized information is displayed together on just one side of the card.

Figure 17:
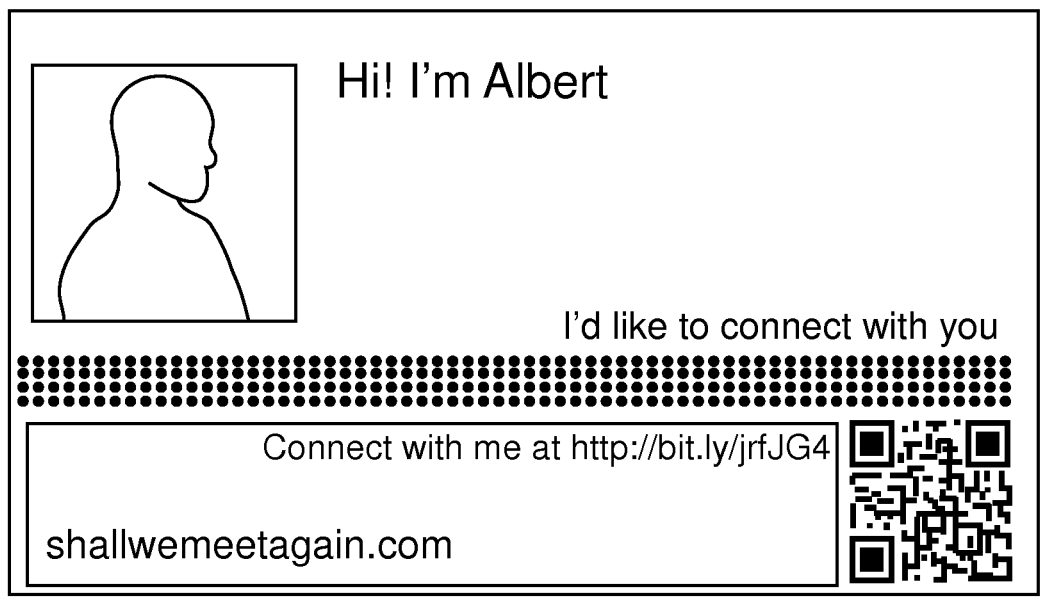
FIG. 17 illustrates a sample of a design of a card that can be used for dating or business networking, in accordance with one embodiment of the present invention.

FIG. 17 illustrates a sample of a design of a card that can be used for dating or business networking, in accordance with one embodiment of the present invention. It contains a photo of the campaigner, a named introduction, and a simple message showing interest in the constituent. It also contains instructional text suggesting that the constituent take action, along with a unique shortened link and its corresponding QR code. It also contains an area of white space where the campaigner can physically write a personalized message directly on the card. In this embodiment, all of the generic and personalized information is displayed together on just one side of the card.

Other Alternative Embodiments

Another embodiment of the present invention is a system that uses cookies to identify particular users at a business website (www.business.com in this example), using a personal URL (hereinafter "personurl") such as www.business.com/3j9gj3jg. The personurl achieves purpose of being able to carry the URL to another device or browser.

Using Javascript to provide client personalization for static HTML webpages, a webmaster can just include a single line of Javascript and mark certain div's (by identification via id or class) and the Javascript would handle the injection of personalized content. A webmaster can upload content, to be served to a personurl consumer, based on rules that webmaster sets up against the that consumer's profile. This can significantly eliminate the learning curve associated with hosting and managing a webmaster's own content management systems (CMS) and eliminates the need for an underlying web application engine for that CMS (for example, Joomla relies on PHP5). This would give small business owners the building blocks for building enriched and personalized user experiences that are traditionally done with full-stack web applications, without the overhead and programming learning curve associated with full-stack web applications. Small business owners can control their web hosting costs by outsourcing the heavy lifting to the passive connection system. In the simplest case, the small business owner will only be hosting a series of static pages. The Javascript snippet from the passive connection system will handle the rest, and is fully controllable from the passive connection system. This method helps small business implement their visitor personalization strategy. One of skill in the art will recognize that the key to achieving democratized personalization of web experiences is to eliminate the user privacy walls that hamper information discovery.

Another embodiment of the present invention is a system for client communications and case management. This would be a client communications solution whereby a code unique to the client will link them to a personalized dashboard that shows the most recent status of their case. An example use case would be a solution for a patent agent and his clients. The patent agent would provide the client with the unique code that would link to the client's dashboard. The dashboard would show the client's case file and related communication history. The client is able to use this unique code to access their case file directly at any time. This allows the client to get information about the status of his patent filing without need to call or email the patent agent. This could all be done through the patent agent's business card, as an example of the distribution mechanism. This solution obviates the need for the patent agent to create his own website with user accounts and thusly obviates the need for the client to sign-up for any sort of account. A simple authentication layer can be used so that confidentiality can be protected should the code fall into the hands of an unauthorized third party.

Another embodiment of the present invention is a system for policy documents and tracking prospective insurance clients. After a first meeting, it would be a way for an insurance agent to serve a menu of possible policy options tailored for a potential client's situation and needs. The landing page for this passive connection could show changes to the policy over time; this would be useful because the difficulty of being informed about changes to an insurance policy is a major issue for insurance customers. Insurance agents can use the service to provide insurance quotes to potential clients after they come in to discuss their insurance needs. The portal can then function as means for the insured to see the details of their most current coverage.

Another embodiment of the present invention is a method for a business to set up a plurality of passive connection codes and landing pages and associating them. This method starts with the step of provisioning X number of connection data structure instances, which can each be represented by a link, QR code, QR card, link card, bar code, RFID tag, etc. All representations default to bringing a visiting constituent to the business' default landing page. The next step would be for the business to create a custom landing page for every promotion or subject they want customers to know about. The next step would then be for the business to create chains of landing pages using the landing pages made in the last step. The next step would be for the business to create rules for how and when to serve the landing pages or chains of landing pages. This could be implemented in a rule set under a commercial off-the-shelf rules engine. During the operation of the passive connection system, for any connection managed the business can configure it to (a) forward to the default landing page, (b) forward to a custom landing page, (c) forward to a chain of landing pages, or (d) use a rule set to dynamically or conditionally serve any landing page or chain of landing pages according to environmental factors of who/what/when/where/why/how a constituent engages and visits. The next step may be for the business to create an advanced rule for viral referrals, such that when a customer refers a friend, the system would prompt him to add information about what the friend would like to see (to further personalize content served to the friend), and such that rules are created for serving landing pages to referrals based on answers received from the customer.

This passive connection technique can be applied to areas as diverse as pastoral care, student/teacher assignments, landlord/tenant communication, personal training, passes to events, etc. In the example of pastoral care, a priest creating a passive connection with a subject can provide religious guidance to those in need without having to register those with the institution. This can find usefulness in anonymous confession, for example. It can also be used in the context of proselytizing potential followers of a religious organization, whereby the passive connection is initially established to bring a new recruit into the organization.

In the example of student/teacher assignments, the passive connection system could be used as a parent/teacher portal and a way to report disciplinary action without direct unsolicited communication. In the example of personal training, a personal trainer can stay in passive communication with his subject and provide personalized tips and guidance within a workout program but at the same time allow the subject the flexibility and independence needed to create good fitness habits.

Another embodiment of the present invention is in a live game, such as a scavenger hunt. The passive connection cards can be pre-printed and distributed to each player as an identity, whereby the passive connection system allows an administrator to program each with an identity that includes attributes like points, collected items, or other such attributes, qualities or items a player might own. The players can then use the cards to transact items or initiate game actions that progress the game until a winner emerges, as in any typical goal-based game. Similarly, the passive connection cards could be left in hidden places in a scavenger hunt setup, whereby the passive connection system is used to keep track of which players found which card.

Another embodiment of the present invention is in using passive connection codes for a check-in system. For this application, a QR or other visual code representation would be most useful. There can be various uses for such a system, such as applying it to inventory tracking for warehoused items. The warehoused items would have these uniquely deployed passive connection codes that would be scanned when the item is introduced to, moved to, or shipped out of the warehouse. In this case, the passive connection codes would take the place of industry-standard bar codes or RFID's. The advantage to using the passive connection codes of the present invention is the configurability and re-programmability of those codes in spontaneous situations. Such a system would allow the codes to be reused over and over again while at the same time maintaining its history of interactions, scans, etc.

Another embodiment of the present invention is in using passive connection codes for a snail mail system. In this system, all the typical aspects of snail mail would be implemented in terms of the passive connection technique. For example, a mail system that typically manufactures envelopes could use passive connection cards (with unique codes on them) to "enclose" text or other content, for delivery through a snail mail system such as a postal delivery service. The sender would enclose content by scanning the content QR code and be brought to a configuration landing page, where he could configure the content that the recipient should see or have access to. Even the postage itself, typically in the form of a stamp bought separately from the envelope, could take the form of a QR code printed on the passive connection card. One could then scan the QR code and then pay for the postage through a landing page. When the passive connection card is sent for processing and delivery through the postage system, the same code could be scanned by the postage system and cross-referenced in a database, making sure the postage was paid for before sending the passive connection card. When finally delivered, the recipient of the passive connection card could effectively "open" whatever was enclosed by the sender by scanning the content QR code and consuming the content that was enclosed by the sender. To emulate the current snail mail processes, the passive connection card could be designed in such a way that it looks like an envelope. The content QR code and postage QR code could then be placed strategically to emulate where content and postage is typically placed or accessed. For example, a content QR code may be placed on an image of an envelope flap printed on one side of the passive connection card to look like a seal placed on a letter, since that is where one would go to open a letter in a traditional snail mail system.

Similarly, the postage QR code may be placed at the top-right corner of the opposite side of the passive connection card since that is where a stamp is traditionally placed. Finally, one of skill in the art will recognize that there may be security issues involved with sending snail mail where anyone can just scan the content code and consume the content intended only for the recipient. This problem can be curbed by the introduction of a security layer, such as a public or private key or perhaps a text password that is already known to the recipient.

Another embodiment of the present invention is a system for recalling the date, time, location and context of an event that occurred. This could be implemented using passive connection codes uniquely printed on business cards. When a businessman goes to a networking event, he will hand his business card to a new acquaintance after first clicking into the unique link (in this case, clicking can be either scanning a QR code or typing in the printed URL on the card). While clicking that unique link, the businessman will have the opportunity to record information that will help him recall the context by which he met the new acquaintance, along with meta-data such as the date/time and location of the meeting.

Another embodiment of the present invention is using passive connection codes in a parking system. For example, if a private parking space owner knows that he does not use the parking space 6 months out of the year and decides to rent out the parking space to anyone needing it on a spontaneous basis, he could leave a passive connection code representation, whether on a card or a posted sign somewhere in or near the parking space. When the code is followed or scanned, it would take the visitor to a landing page where that visitor can enter payment and identifying information such as make and model of the vehicle being parked.

Another embodiment of the present invention is a system for lobbying or running grassroots campaigns. This application is very similar to the application for political campaigns. The fundamental difference is in the possible actions taken by constituents on their landing pages, along with who the constituents are. In lobbying, the constituent is any official that can effect legislation, rule-making, or other authoritative positions to any degree that a lobbyist would find value in influencing and swaying. For a grassroots campaign, the constituency would also be potential voters like when the passive connection system is purposed for political candidates. Unlike political candidates though, the grassroots campaign system may be more open in the sense that the grassroots campaign may open the campaigner landing page to more liberal editing by a wider range of individuals than a political candidate would.

The passive connection technique used in each of these embodiments gives users the means to provide personalized content to their constituents without requiring account creation or active subscription. This model recognizes that people do not want to be inundated with outbound marketing and instead prefer to access content at their own initiative and convenience. The system uses unique QR codes and URL's which function to allow customers to receive personalized content and allow businesses to receive data on individual behavior while simultaneously marketing their products and/or service. Today delivering personalized content to individuals requires accounts to be created. Requiring users to login is a barrier to providing personalized content. Users must remember their username and password to access their account. They may be required to divulge personal information in order to create an account which can be a deterrent for some potential users. A web user today is inundated with too many accounts in too many places—the average web user has an unmanageable number, deterring them from creating new accounts and creating new relationships with merchants. Typically creating an account avails the user to e-mail marketing and divulgence of personal information. There exists no in-between paradigm.

Software Architecture of the Present Invention

Using a specific example, a passive connection dating system, the following explanation will detail how to build and use said system. First, a connection data structure must be designed and implemented. The data structure may, in this example, contain the following fields:

```
id (int)
connectionLocation_id (int)
user_id (int)
code (string)
qrPhotoUrl (string)
shortUrl (string)
description (string)
landingPageMessage (string)
landingPageLink (string)
landingPageMode (string)
cardFrontFilename (string)
cardBackFilename (string)
clicks (int)
```

In this data structure, there is a foreign key connectionLocation_id into an instance of another data structure that contains data about the physical location of the connection. This could be used to store the common address fields such as number, street, city, state, zip code, etc. It could also be used to store the GPS location fields such as latitude and longitude. In this data structure, there is also a foreign key user_id into an instance of another data structure that contains data about the user of the passive connection system that owns this connection instance. This would typically be the campaigner, in the terminology of this passive connection system. In this data structure, there is also a code field, which contains a unique string that identifies this connection. This string could be created using any of the methods for generating unique links earlier, or any other method that generates a unique string for each instance of a connection data structure. Recommended ways to generate this unique string are to run an MD5 hash of the id field, or perhaps a hash of a concatenation of the id and user_id fields. One of skill in the art will recognize that to further avoid hashing collisions, one may apply a randomly-generated salt to the results of the hashing operation. In this data structure, there is also the shortUrl and qrPhotoUrl fields. These may be used to store the URL of a shortened link that links to a landing page that is governed by the data in this connection. The qrPhotoUrl could simply be a link to an image that is a direct QR representation of the shortUrl. In this data structure, there is also a description field that can be used to store free-form text notes regarding the connection. This could be information that a campaigner transcribes about a constituent. It could even be a reminder to the campaigner as to what he should say to the constituent. In this data structure, there is also a landingPageMessage field, which can be used to store the message that the campaigner leaves for the constituent. In this data structure, there is also a landingPageLink field, which can be used to store the URL of a landing page, or other web-accessible page, that the campaigner would like to redirect the constituent to when the constituent visits the landing page associated with this connection. In this data structure, there is also a landingPageMode field, which can be used to store an identifier string that can guide the behavior of the passive connection system when a constituent visits the landing page associated with this connection. For example, landingPageMode could be set to REDIRECT, in which case the system will redirect the visiting constituent to the URL stored under landingPageLink. As another example, landingPageMode could be set to DISPLAY_MESSAGE, in which case the system will show the text stored under landingPageMessage to the visiting constituent on a stable landing page. In this data structure, there is also the cardFrontFilename and cardBackFilename fields, which can be used to store the filenames of the generated passive connection card images that are printable on physical media. Finally, in this data structure, there is also a clicks field, which can be used to store a count of the number of times a constituent visits the landing page associated with this connection.

An application layer would be built around this connection data structure. The data structure may refer to either a database table or an in-memory data structure used in an application, both, or other possible representations of data. This application layer can be built using commercially available or off-the-shelf tools, frameworks and libraries, such as web frameworks, content management systems (CMS's) and others. The application layer would be the mechanism on which functions for manipulating the connection are implemented. For this dating service, the application layer may also include a component for building a user profile whereby demographic information could be filled in such as age, gender, location, weight, height, hair color, eye color, body type, etc. Other data such as social network links and introductory essays could be added as well in order to fully inform constituents about the user without providing direct contact information or other personal information.

Using a specific example, a political engagement system, the following explanation will detail how to build and use said system. First, a connection data structure must be designed and implemented. The data structure may, in this example, contain the following fields:

```
id (int)
user_id (int)
transaction_id (int)
code (string)
shortUrl (string)
qrPhotoUrl (string)
landingPageMessage (string)
landingPageLink (string)
landingPageMode (string)
cardFrontFilename (string)
cardBackFilename (string)
clicks (string)
physicalAddress_id (int)
gpsLocation_id (int)
timestamp (datetime)
description (string)
firstName (string)
lastName (string)
emailAddress (string)
phoneNumber (string)
sex (string)
dateOfBirth (date)
partyAffiliation (string)
supportSignage (bool)
supportDonor (bool)
decidedSpecify (string)
howLikelyToVote (int)
```

As one of skill in the art may observe, the fields in this data structure are similar to the fields used in the connection data structure of the passive connection dating system. A major difference is that identification data about a potential voter, such as firstName, lastName, emailAddress, phoneNumber, sex, dateOfBirth, etc. is included in this data structure. This is used for the campaigner to identify the real-life person who is associated with the connection. This information could be filled in before the campaigner makes contact with the constituent, such as in the case when the campaigner downloads voter data from a voter database and inserts that data in a connections database. Then, when the campaigner is out meeting constituents, he can reference this pre-determined list to personalize the first interaction with a constituent. Other fields can be left empty before the campaigner meets a constituent, but while meeting a constituent, can be filled in. partyAffiliation, supportSignage, supportDonor, decidedSpecify, and howLikelyToVote are examples of these fields that would be filled in as the campaigner canvasses constituents and learns about them.

The connection data structure contains information about the constituent and also configuration data for modifying and personalizing a constituent landing page. Much of this constituent landing page may also be derived from general information about the campaigner, since the landing page should promote engagement with the campaigner to the constituent. So a campaigner data structure must also be designed and implemented. The data structure may, in this example, contain the following fields:

```
id (int)
photo_id (int)
physicalAddress_id (int)
notificationSetting_id (int)
runningFor (string)
username (string)
password (string)
firstName (string)
lastName (string)
emailAddress (string)
phoneNumber (string)
about (string)
sex (string)
dateOfBirth (date)
lastLogin (datetime)
memberSince (date)
active (bool)
plan (string)
websiteUrl (string)
videoUrl (string)
slogan (string)
joinUrl (string)
donateUrl (string)
openingScript (string)
closingScript (string)
```

In this case, for building a candidate profile, there are fields that capture important elements of that candidate's campaign. The runningFor field would, for example, be used to store the name of the political office that the candidate is running for. The openingScript and closingScript fields would be used to provide a common script for volunteers to go out and canvass with—the text serves as a guide and would be replicated across the system for volunteers to easily access the campaign message.

An application layer would be built around this connection data structure. The data structure may refer to either a database table or an in-memory data structure used in an application, both, or other possible representations of data. This application layer can be built using commercially available or off-the-shelf tools, frameworks and libraries, such as web frameworks, content management systems (CMS's) and others. The application layer would be the mechanism on which functions for manipulating the connection are implemented. For this political constituency management service, the application layer may also include a component for building a candidate profile whereby demographic information could be filled in such as age, location, main campaign website, political party, or previous experience. Other data such as social network links, issues that are central to the campaign, a tally of contributions, and other information could be added as well in order to fully inform constituents about the candidate.

A constituent services system for incumbent politicians could also be built using a connection data structure similar to the voter engagement system and dating system. The need for such a separate system (separate from the voter engagement system) is because of campaign finance regulation and an inherent constituency segmentation. Campaign finance regulation tends to make it illegal for government-originated funds designated for constituent services to be used in running a re-election campaign. In the constituent services system, not all constituents necessarily must be potential voters—they could just be people within the jurisdiction of representation by the incumbent politician. Constituents of this system may generally already be supporters of the incumbent politician, while in the voter engagement system the constituents are most likely on-the-fence registered voters or voters with opposing viewpoints whom the candidate is trying to sway to vote for him. In a constituent services system, one of the most important features built into an application layer would be a system for receiving and acting on feedback from the constituency. The anonymity of the constituent services system using passive connection techniques would make it such that constituents are more open about sharing their thoughts on how the incumbent politician is faring and doing his job. To the incumbent politician, it is just as important knowing what he's doing badly as it is to know what he's doing well.

For all the different applications of the passive connection system, there are common features of each that can be isolated and offered separately as a base set of features. One way in which these common features could be offered separately is to create an API for each of these functions. The API would have functions that carry out these general tasks:

---

Provisioning of unique links
Customization of web-accessible landing pages for each unique link
Cost-effectively printing sets of leave-behinds that carry unique links
Data collection from constituents
Opt-in for constituent personal information
Click tracking
Click counting
Geo-location and timestamp analysis
Landing page action tracking
Application of algorithms that measure constituency engagement
Mobile-optimization
Integration with a mobile platform

---

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the scope of the present invention as defined by the claims.

What is claimed is:

1. A method for serving personalized media to and engaging with a plurality of constituents, comprising:
provisioning a unique one-to-one bidirectional connection, a unique campaigner landing page, and a unique constituent landing page in a connections database unique to each of the plurality of constituents;
generating a unique Quick Response (QR) code for each of the plurality of constituents, wherein each of the plurality of constituents represents said unique one-to-one bidirectional connection, which when followed, serves said unique constituent landing page;
printing said unique QR code on a leave-behind printed media to be provided to a corresponding constituent;
associating with said unique one-to-one bidirectional connection a first constituent datum in said connections database, said first constituent datum received through the unique campaigner landing page, said first constituent datum comprising at least a digital media content, a date-time stamp, and a geo-location coordinate;
personalizing said unique constituent landing page in response to a combination of said unique one-to-one bidirectional connection and said first constituent datum;
associating with said unique one-to-one bidirectional connection a second constituent datum in said connections database, said second constituent datum received through the unique constituent landing page by a passive connection, said second constituent datum comprising at least a digital media content, a date-time stamp, and a geo-location coordinate;
reordering content on said unique constituent landing page into a personalized order unique to each of the plurality of constituents in response to a combination of said unique one-to-one bidirectional connection, said first constituent datum, and said second constituent datum; and
serving said unique constituent landing page uniquely to each of the plurality of constituents in response to each of the constituents scanning their corresponding unique QR code,
wherein as additional constituent datum is gathered, personalization of the unique constituent landing page is adjusted, wherein the additional constituent datum collected is used to further personalize the unique constituent landing page, increasing engagement with the constituents and increasing constituent data collection.

2. The method of claim 1, wherein the passive connection is an omission of a login session.

3. The method of claim 1, further comprising the step of:
redirecting a request for said unique constituent landing page to a separate web document.

4. The method of claim 1, wherein personalizing said unique constituent landing page comprises serving content on said unique constituent landing page in a personalized order in response to said combination of said unique one-to-one bidirectional connection and said first constituent datum; and
wherein further personalizing said unique constituent landing page comprises serving media on said unique constituent landing page in a further personalized order in response to said combination of said unique one-to-one bidirectional connection, said first datum and said second datum.

5. The method of claim 1, further comprising the step of:
determining a constituent engagement level in response to said combination of said unique one-to-one bidirectional connection, said first datum and said second datum.

6. The method of claim 1, further comprising:
displaying the unique constituent landing page to at least one constituent, said unique constituent landing page personalized for said constituent and said constituent led to said unique constituent landing page using the leave-behind printed media;
processing a constituent action taken by said constituent on said unique constituent landing page by the passive connection; and
recommending at least one campaigner action for further personalizing said unique constituent landing page in response to said constituent action.

7. The method of claim 1, further comprising:
displaying the unique campaigner landing page to at least one campaigner in response to an action taken by said campaigner on said unique constituent landing page.

8. The method of claim 1, further comprising:
processing an editing action taken by at least one campaigner on said unique campaigner landing page that further personalizes said unique constituent landing page.

9. The method of claim 1, further comprising:
geo-locating the unique one-to-one bidirectional connection by associating the unique one-to-one bidirectional connection with geo-location coordinates adapted to determine a spatial geo-position in which the unique one-to-one bidirectional connection was made.

10. The method of claim 9, further comprising:
utilizing the geo-location coordinates to determine where at least one constituent is consuming content on said unique constituent landing page.

11. A system for serving personalized media to and engaging a plurality of constituents, comprising:
one or more memories for storing program code;
one or more communication links to a database; and
one or more processors, operatively connected to the one or more memories, for executing the stored program code, which when executed causes the system to perform a process comprising the steps of:
provisioning a unique one-to-one bidirectional connection, a unique campaigner landing page, and a unique constituent landing page in a connections database unique to each of the plurality of constituents;
generating a unique Quick Response (QR) code for each of the plurality of constituents, wherein each of the plurality of constituents represents said unique one-to-one bidirectional connection, which when followed, serves said unique constituent landing page;
printing said unique QR code on a leave-behind printed media to be provided to a corresponding constituent;
associating with said unique one-to-one bidirectional connection a first constituent datum in said connections database, said first constituent datum received through the unique campaigner landing page, said first constituent datum comprising a digital media content, a date-time stamp, and a geo-location coordinate;
personalizing said unique constituent landing page in response to a combination of said unique one-to-one bidirectional connection and said first constituent datum;
associating with said unique one-to-one bidirectional connection a second constituent datum in said connections database, said second constituent datum received through the unique constituent landing page by a passive connection, said second constituent datum comprising a digital media content, a date-time stamp, and a geo-location coordinate;
reordering content on said unique constituent landing page into a personalized order unique to each of the plurality of constituents in response to a combination of said unique one-to-one bidirectional connection, said first constituent datum, and said second constituent datum; and
serving said unique constituent landing page uniquely to each of the plurality of constituents in response to each of the constituents scanning their corresponding unique QR code,
wherein as additional constituent datum is gathered, personalization of the unique constituent landing page is adjusted, wherein the additional constituent datum collected is used to further personalize the unique constituent landing page, increasing engagement with the constituents and increasing constituent data collection.

12. The system of claim 11, wherein the passive connection is an omission of a login session.

13. The system of claim 11, wherein the stored program code when executed further causes the system to perform the step of:
redirecting a request for said unique constituent landing page to a separate web document.

14. The system of claim 11, wherein personalizing said unique constituent landing page comprises serving content on said unique constituent landing page in a personalized order in response to said combination of said unique one-to-one bidirectional connection and said first constituent datum; and wherein further personalizing said unique constituent landing page comprises serving content on said unique constituent landing page in a further personalized order in response to said combination of said unique one-to-one bidirectional connection, said first datum and said second datum.

15. The system of claim 11, wherein the stored program code when executed further causes the system to perform the step of:
determining a constituent engagement level in response to said combination of said unique one-to-one bidirectional connection, said first datum and said second datum.

16. A non-transitory digital storage medium for storing executable program code, said program code when executed by a process causing said processor to perform a process for serving personalized media to and engaging with a plurality of constituents, the process comprising steps to:
provision a unique one-to-one bidirectional connection, a unique campaigner landing page, and a unique constituent landing page in a connections database unique to each of the plurality of constituents;
generate a unique Quick Response (QR) code for each of the plurality of constituents wherein each of the plurality of constituents represents said unique one-to-one bidirectional connection, which when followed, serves said unique constituent landing page;
print said unique QR code on a leave-behind printed media to be provided to a corresponding constituent;
associate with said unique one-to-one bidirectional connection a first constituent datum in said connections database, said first constituent datum received through the unique campaigner landing page, said first constituent datum comprising at least a digital media content, a date-time stamp, and a geo-location coordinate;

personalize said unique constituent landing page in response to a combination of said unique one-to-one bidirectional connection and said first constituent datum;

associate with said unique one-to-one bidirectional connection a second constituent datum in said connections database, said second constituent datum received through the unique constituent landing page by a passive connection, said second constituent datum comprising at least a digital media content, a date-time stamp, and a geo-location coordinate;

reordering content on said unique constituent landing page into a personalized order unique to each of the plurality of constituents in response to a combination of said one-to-one bidirectional unique connection, said first constituent datum, and said second constituent datum; and serve said unique constituent landing page uniquely to each of the plurality of constituents in response to each of the constituents scanning their corresponding unique QR code, wherein as additional constituent datum is gathered, personalization of the unique constituent landing page is adjusted, wherein the additional constituent datum collected is used to further personalize the unique constituent landing page, increasing engagement with the constituents and increasing constituent data collection.

\* \* \* \* \*